(12) United States Patent
Yamaguchi et al.

(10) Patent No.: US 11,079,226 B2
(45) Date of Patent: Aug. 3, 2021

(54) PHYSICAL QUANTITY SENSOR, METHOD OF MANUFACTURING PHYSICAL QUANTITY SENSOR, ELECTRONIC APPARATUS, AND VEHICLE

(71) Applicant: Seiko Epson Corporation, Tokyo (JP)

(72) Inventors: Keiichi Yamaguchi, Ina (JP); Ryuta Nishizawa, Nagano (JP)

(73) Assignee: Seiko Epson Corporation

( * ) Notice: Subject to any disclaimer, the term of this patent is extended or adjusted under 35 U.S.C. 154(b) by 180 days.

(21) Appl. No.: 16/369,080

(22) Filed: Mar. 29, 2019

(65) Prior Publication Data
US 2019/0301865 A1  Oct. 3, 2019

(30) Foreign Application Priority Data

Mar. 30, 2018 (JP) .............................. JP2018-067111

(51) Int. Cl.
*G01C 19/5614* (2012.01)
*G01L 1/10* (2006.01)
*G01C 19/5628* (2012.01)

(52) U.S. Cl.
CPC ..... *G01C 19/5614* (2013.01); *G01C 19/5628* (2013.01); *G01L 1/106* (2013.01)

(58) Field of Classification Search
CPC ............ G01C 19/5614; G01C 19/5621; G01C 19/5628; G01C 19/5656; G01C 19/5663; G01C 19/5783
See application file for complete search history.

(56) References Cited

U.S. PATENT DOCUMENTS

| | | | |
|---|---|---|---|
| 2005/0284223 A1* | 12/2005 | Karaki | G01C 19/56 73/504.12 |
| 2015/0268107 A1 | 9/2015 | Nishizawa et al. | |
| 2016/0116286 A1* | 4/2016 | Nishizawa | B81B 3/0086 257/415 |

FOREIGN PATENT DOCUMENTS

| | | |
|---|---|---|
| JP | 2010-256332 A | 11/2010 |
| JP | 2015-184124 A | 10/2015 |

* cited by examiner

*Primary Examiner* — Benjamin R Schmitt
(74) *Attorney, Agent, or Firm* — Harness, Dickey & Pierce, P.L.C.

(57) ABSTRACT

A physical quantity sensor includes: a supporting member; and a sensor element supported by the supporting member, in which the sensor element includes a vibrator element, a drive signal wiring disposed on the vibrator element, and a first detection signal terminal and a second detection signal terminal disposed on the vibrator element, the supporting member includes a substrate on which the sensor element is joined, and a first detection signal wiring and a second detection signal wiring disposed on the substrate, and the first detection signal wiring and the second detection signal wiring respectively include areas that extend along a second axis intersecting with the first axis and that intersect with the drive signal wiring in a plan view as seen in a direction in which the sensor element and the substrate overlap with each other.

7 Claims, 22 Drawing Sheets

PHYSICAL QUANTITY SENSOR, METHOD OF MANUFACTURING PHYSICAL QUANTITY SENSOR, ELECTRONIC APPARATUS, AND VEHICLE

CROSS-REFERENCE

The entire disclosure of Japanese Patent Application No. 2018-067111, filed Mar. 30, 2018 is expressly incorporated by reference herein.

BACKGROUND

1. Technical Field

The present disclosure relates to a physical quantity sensor, a method of manufacturing the physical quantity sensor, an electronic apparatus, and a vehicle.

2. Related Art

As one type of physical quantity sensor, for example, a vibration type gyro sensor using a piezoelectric body such as a vibrator element described in JP-A-2010-256332 is known. The vibrator element described in JP-A-2010-256332 includes a base portion, first and second coupling arms respectively extending from the base portion along an X axis in positive and negative directions, first and second detection arms respectively extending from the base portion along a Y axis orthogonal to the X axis in the positive and negative directions, first and second drive arms respectively extending from the first coupling arm along the Y axis in the positive and negative directions, and third and fourth drive arms respectively extending from the second coupling arm along the Y axis in the positive and negative directions. Here, detection signal electrodes in which detection signals are generated by detection vibration are formed in the first and second detection arms and drive signal electrodes to which drive signals for drive vibration are input are formed in the first and second drive arms. In JP-A-2010-256332, a first detection signal generated in the detection signal electrode formed in the first detection arm and a second detection signal generated in the detection signal electrode formed in the second detection arm are differentially amplified to generate a differential amplification signal and a predetermined physical quantity is detected based on the differential amplification signal. The vibrator element is accommodated in a package and fixed to a package base of the package.

Meanwhile, a configuration described in JP-A-2010-256332 has a problem in that since the vibrator element is directly fixed to the package base, a stress such as a thermal stress generated in the package base is transmitted to the vibrator element and as a result, an output (so-called zero point output) of the detection signal when not receiving an angular velocity to be detected changes.

SUMMARY

An advantage of some aspects of the present disclosure is to provide a physical quantity sensor capable of improving detection accuracy and a method of manufacturing the physical quantity sensor, and to provide an electronic apparatus and a vehicle including the physical quantity sensor.

The present disclosure can be implemented as the following application examples.

A physical quantity sensor according to an application example of the present disclosure includes: a base; a supporting member supported by the base; and a sensor element supported by the supporting member, in which the sensor element includes a vibrator element, a drive signal wiring that is disposed on the vibrator element, that transmits a drive signal for vibrating a drive portion of the vibrator element, and that extends along a first axis, and a first detection signal terminal and a second detection signal terminal that are disposed on the vibrator element and that output detection signals in accordance with vibration of a detection portion of the vibrator element, the supporting member includes a substrate on which the sensor element is joined, a first detection signal wiring that is disposed on the substrate and that transmits the detection signal from the first detection signal terminal, and a second detection signal wiring that is disposed on the substrate and that transmits the detection signal from the second detection signal terminal, and the first detection signal wiring and the second detection signal wiring respectively include areas that extend along a second axis intersecting with the first axis and that intersect with the drive signal wiring in a plan view as seen in a direction in which the sensor element and the substrate overlap with each other.

In the physical quantity sensor according to the application example, the area may be positioned closer to a center of the substrate than an outer edge of the substrate in the plan view.

In the physical quantity sensor according to the application example, the supporting member may include a first portion in a frame shape joined to the base, a second portion in a frame shape disposed inside the first portion, the substrate to which the sensor element is joined and which is disposed inside the second portion, a first beam portion swingably supporting the second portion around a third axis with respect to the first portion, and a second beam portion swingably supporting the substrate around a fourth axis intersecting with the third axis with respect to the second portion.

In the physical quantity sensor according to the application example, the supporting member may include a first portion in a frame shape joined to the base, the substrate to which the sensor element is joined and which is disposed inside the first portion, and a first beam portion swingably supporting the substrate around a third axis with respect to the first portion.

In the physical quantity sensor according to the application example, the physical quantity sensor may include a metal bump joining the sensor element and the substrate.

A method of manufacturing a physical quantity sensor according to another application example of the present disclosure is a method of manufacturing a physical quantity sensor having abase, a supporting member supported by the base, and a sensor element supported by the supporting member, the method including: preparing the base, the supporting member, and the sensor element; and joining the supporting member and the sensor element, in which in the preparing, the sensor element includes a vibrator element, a drive signal wiring that is disposed on the vibrator element, that transmits a drive signal for vibrating a drive portion of the vibrator element, and that extends along a first axis, and a first detection signal terminal and a second detection signal terminal that are disposed on the vibrator element and that output detection signals in accordance with vibration of a detection portion of the vibrator element, the supporting member includes a substrate, a first detection signal wiring that is disposed on the substrate and that transmits the detection signal from the first detection signal terminal, and a second detection signal wiring that is disposed on the substrate and that transmits the detection signal from the second detection signal terminal, and in the joining, the first detection signal wiring and the second detection signal wiring respectively include areas that extend along a second axis intersecting with the first axis and that intersect with the drive signal wiring in a plan view as seen in a direction in which the sensor element and the substrate overlap with each other.

An electronic apparatus according to still another application example of the present disclosure includes: the physical quantity sensor according to the application example, in which the physical quantity sensor includes a circuit element.

A vehicle according to still another application example of the present disclosure includes: the physical quantity sensor according to the application example; and a body on which the physical quantity sensor is mounted.

DESCRIPTION OF EXEMPLARY EMBODIMENTS

Hereinafter, a physical quantity sensor, a method of manufacturing the physical quantity sensor, an electronic apparatus, and a vehicle according to the present disclosure will be described in detail based on embodiments illustrated in the accompanying drawings. Furthermore, each of the drawings may be appropriately enlarged or reduced so as to display parts to be described in a recognizable state.

1. Physical Quantity Sensor

1a. First Embodiment

Figure 1:
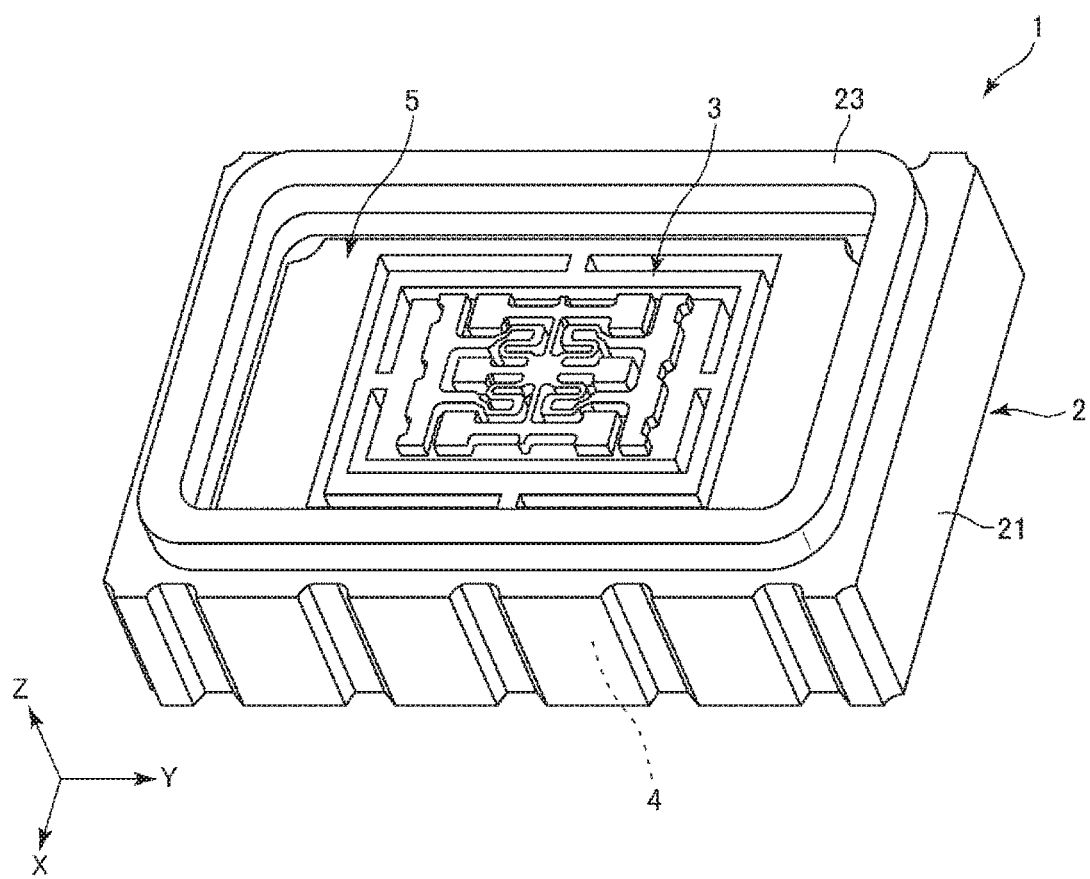
FIG. 1 is a perspective view illustrating a physical quantity sensor according to a first embodiment.
Figure 2:
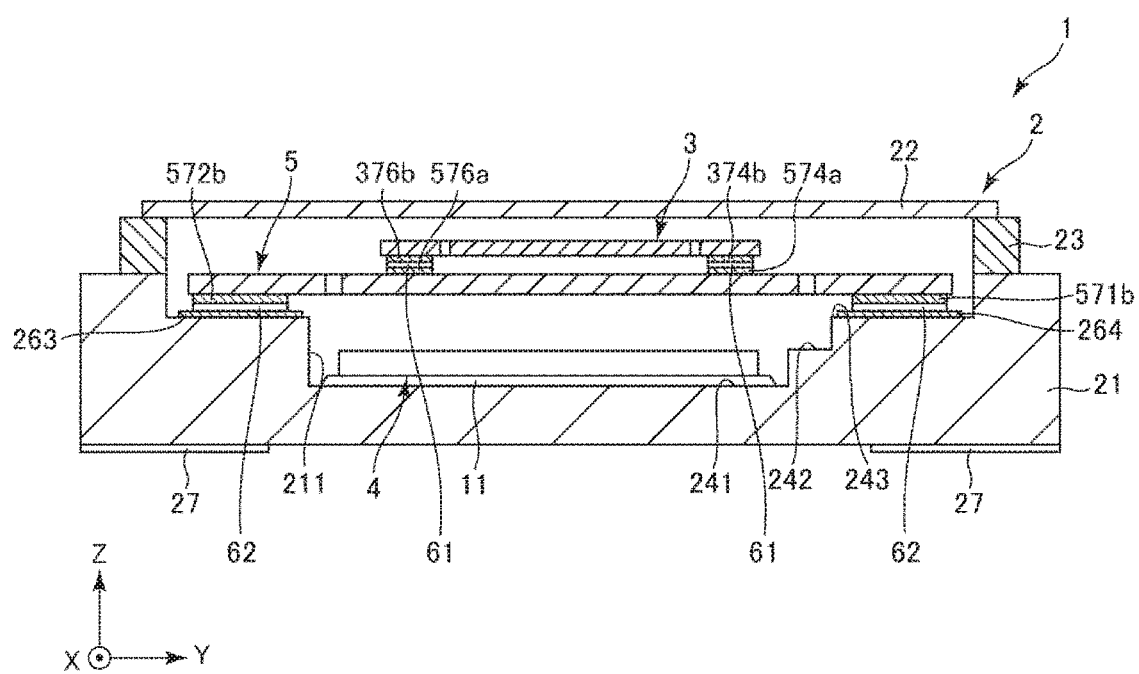
FIG. 2 is a cross-sectional view of the physical quantity sensor illustrated in FIG. 1.
Figure 3:
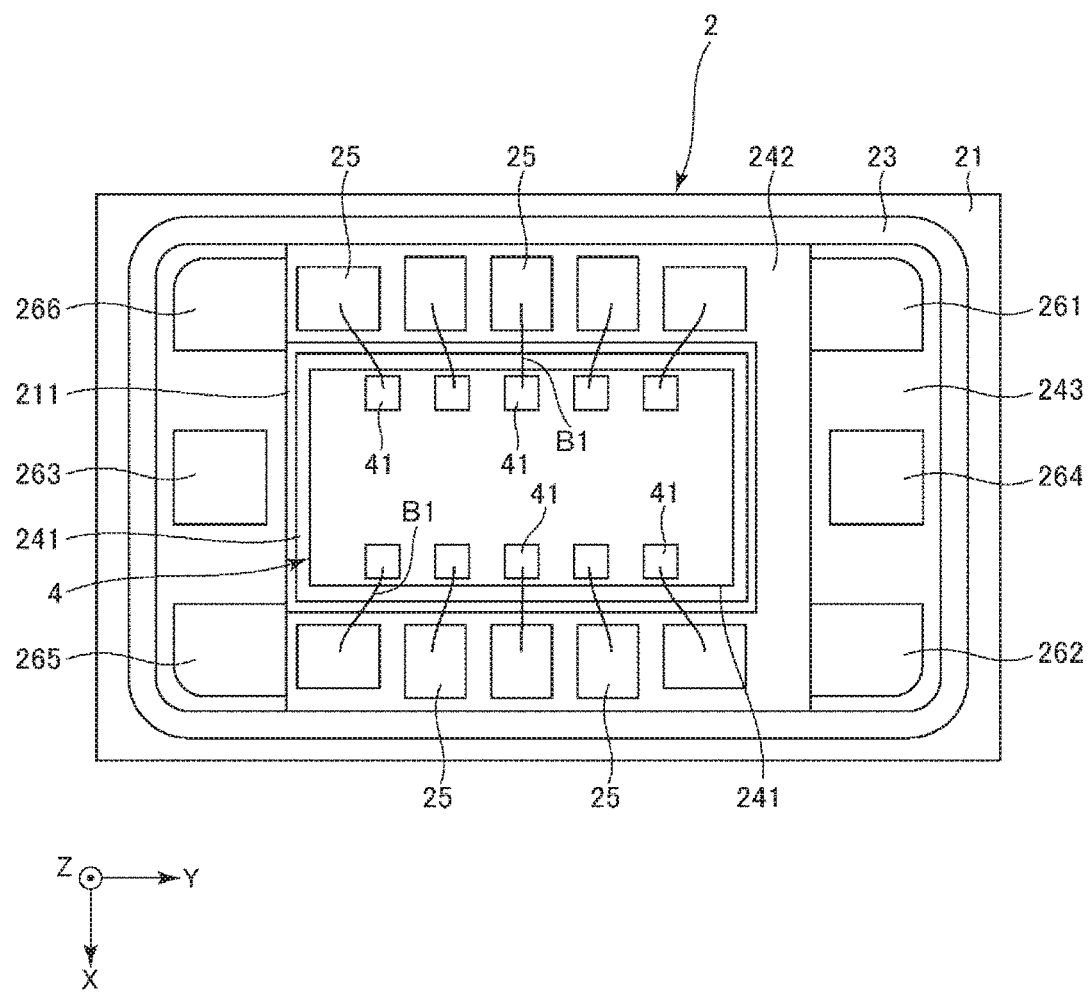
FIG. 3 is a plan view of a circuit element included in the physical quantity sensor illustrated in FIG. 1.
Figure 4:
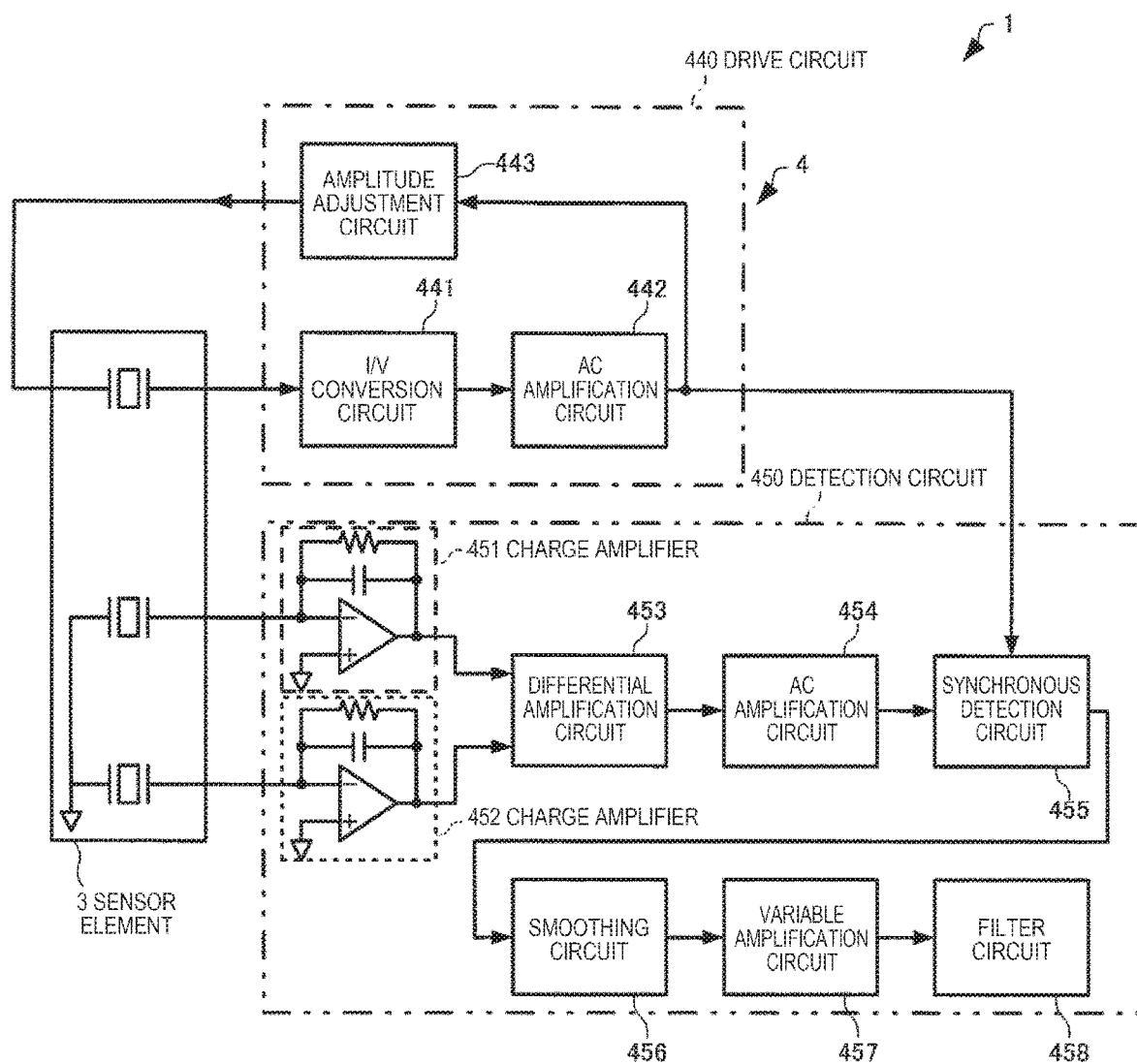
FIG. 4 is a diagram illustrating a configuration example of the circuit element.

FIG. 1 is a perspective view illustrating a physical quantity sensor according to the first embodiment. FIG. 2 is a cross-sectional view of the physical quantity sensor illustrated in FIG. 1. FIG. 3 is a plan view of a circuit element included in the physical quantity sensor illustrated in FIG. 1. FIG. 4 is a diagram illustrating a configuration example of the circuit element.

In the following description, for convenience of description, the description is performed by using an X axis as an axis corresponding to a first axis of the sensor element, a Y axis as an axis corresponding to a second axis, and a Z axis as an axis corresponding to a thickness direction of the sensor element. That is, the description is performed by appropriately using the X axis, the Y axis, and the Z axis which are three axes orthogonal to one another. In addition, a direction parallel to the X axis is referred to as an "X axis direction", a direction parallel to the Y axis is referred to as a "Y axis direction", a direction parallel to the Z axis is referred to as a "Z axis direction", and a tip side of an arrow indicating each of the axes is "+" and a base end side of the arrow is "−" in each of the drawings. Further, a +Z axis direction side which is an upper side in FIG. 2 is also referred to as "upper" and a −Z axis direction side which is a lower side in FIG. 2 is also referred to as "lower". In addition, in the present embodiment, the X axis, the Y axis, and the Z axis respectively correspond to an electrical axis, a mechanical axis, and an optical axis which are crystal axes of a quartz crystal of a material of the sensor element. Further, a surface facing the +Z axis direction is referred to as "upper surface", a surface facing the −Z axis direction is referred to as "lower surface", and a surface facing a direction intersecting with the Z axis is referred to as "side surface". In addition, in FIG. 1, a lid 22 is not illustrated.

A physical quantity sensor 1 illustrated in FIGS. 1 and 2 is an angular velocity sensor for detecting an angular velocity around the Z axis. The physical quantity sensor 1 includes a package 2, a sensor element 3 accommodated in the package 2, a circuit element 4, and a relay substrate 5. Here, the sensor element 3 is supported by the package 2 via the relay substrate 5 which is an example of a supporting member. In this manner, by interposing the relay substrate 5 between the package 2 and the sensor element 3, it is possible to reduce transmission of a stress such as a thermal stress from the package 2 to the sensor element 3. As a result, it is possible to improve detection accuracy of the physical quantity sensor 1. Hereinafter, each of portions of the physical quantity sensor 1 will be described in order.

Package

The package 2 includes a base 21 in a box shape having a recess portion 211 and a lid 22 in a plate shape joined to the base 21 via a joining member 23 so as to close an opening of the recess portion 211. A space for accommodating the sensor element 3, the circuit element 4, and the relay substrate 5 is formed between the base 21 and the lid 22. The space may be a vacuum state as an example of a reduced pressure state or an inert gas such as nitrogen, helium, argon or the like may be filled in the space and the space may be sealed.

The recess portion 211 of the base 21 includes a lower stage surface 241 positioned on a bottom side, an upper stage surface 243 positioned on an opening side, and a middle stage surface 242 positioned between the lower stage surface 241 and the upper stage surface 243. A component material of the base 21 is not particularly limited, and various ceramics such as aluminum oxide and various glass materials can be used, for example. In addition, a component material of the lid 22 is not particularly limited, and may be a member having a linear expansion coefficient close to that of the component material of the base 21, for example. For example, in a case where the component material of the base 21 is ceramics, the component material of the lid 22 may be an alloy such as kovar or the like. In addition, for example, the joining member 23 is a seal ring made of a metal material such as Kovar or the like and is joined to the base 21 by brazing or the like. The lid 22 is joined to the base 21 by a seam welding or the like via the joining member 23.

As illustrated in FIG. 3, a plurality of terminals 261, 262, 263, 264, 265, and 266 electrically coupled to the relay substrate 5 are provided on the upper stage surface 243. In addition, a plurality of terminals 25 electrically coupled to the circuit element 4 are provided on the middle stage surface 242. Further, as illustrated in FIG. 2, a plurality of external coupling terminals 27 are formed on a rear surface of the base 21. The plurality of terminals 261, 262, 263, 264, 265, and 266, the plurality of terminals 25, and the plurality of external coupling terminals 27 are appropriately coupled by internal wirings and through-holes (not illustrated) formed in the base 21. A component material of these terminals is not particularly limited, and, for example, a metal material such as gold (Au), gold alloy, platinum (Pt), aluminum (Al), aluminum alloy, silver (Ag), silver alloy, chromium (Cr), chromium alloy, nickel (Ni), copper (Cu), molybdenum (Mo), niobium (Nb), tungsten (W), iron (Fe), titanium (Ti), cobalt (Co), zinc (Zn), zirconium (Zr), or the like is used.

Shapes of the base 21 and the lid 22 in a plan view are not limited to the illustrated shape, and may be any shapes.

Circuit Element

As illustrated in FIG. 2, the circuit element 4 is fixed to the lower stage surface 241 of the base 21 by an adhesive 11. As illustrated in FIG. 3, the circuit element 4 includes a plurality of terminals 41, and each of the terminals 41 is electrically coupled to each of the terminal 25 of the package 2 described above by a conductive wire B1. As illustrated in FIG. 4, the circuit element 4 includes a drive circuit 440 which generates a drive signal for drive vibration of the sensor element 3 and a detection circuit 450 which detects an angular velocity ω based on a detection signal outputted from the sensor element 3. Hereinafter, the drive circuit 440 and the detection circuit 450 will be described in detail.

The drive circuit 440 is a circuit for inputting a drive signal for drive vibration of the sensor element 3 to a drive signal electrode 371a of the sensor element 3 to be described below. The drive circuit 440 includes an I/V conversion circuit 441 which is a current/voltage conversion circuit, an AC amplification circuit 442, and an amplitude adjustment circuit 443.

The I/V conversion circuit 441 is electrically coupled to a drive fixed potential electrode 372a of the sensor element 3 to be described below and converts an input alternating current into an alternating current voltage signal and outputs the resultant signal. Here, an alternating current generated by a piezoelectric effect is input to the I/V conversion circuit 441 in accordance with vibration of drive arms 316, 317, 318, and 319 of the sensor element 3 to be described below. Therefore, the I/V conversion circuit 441 outputs an alternating current voltage signal having the same frequency as a vibration frequency of the vibration of the drive arms 316, 317, 318, and 319. The alternating current voltage signal output from the I/V conversion circuit 441 is input to the AC amplification circuit 442.

The AC amplification circuit 442 amplifies and outputs the input alternating current voltage signal. The alternating current voltage signal output from the AC amplification circuit 442 is input to the amplitude adjustment circuit 443.

The amplitude adjustment circuit 443 controls a gain so as to hold the amplitude of the input alternating current voltage signal at a constant value and outputs an alternating current voltage signal after gain control. The alternating current voltage signal output from the amplitude adjustment circuit 443 is input to the drive signal electrode 371a of the sensor element 3 as a drive signal. Accordingly, the drive arms 316, 317, 318, and 319 vibrate.

The detection circuit 450 differentially amplifies a first detection signal and a second detection signal to be described below to generate a differential amplification signal and detects the angular velocity ω based on the differential amplification signal. By using the differential amplification signal as described above, it is possible to improve detection sensitivity by cancelling at least a part of a noise included in the first detection signal and a noise included in the second detection signal. The detection circuit 450 includes a charge amplifier 451, a charge amplifier 452, a differential amplification circuit 453, an AC amplification circuit 454, a synchronous detection circuit 455, a smoothing circuit 456, a variable amplification circuit 457, and a filter circuit 458.

The charge amplifier 451 is electrically coupled to a first detection signal electrode 373a of the sensor element 3 to be described below and converts an input alternating current into an alternating current voltage signal and outputs the resultant signal. Here, the alternating current output from the first detection signal electrode 373a of the sensor element 3 to be described below is input to the charge amplifier 451 as a first detection signal. In the same manner, the charge amplifier 452 is electrically coupled to a second detection signal electrode 375a of the sensor element 3 to be described below and converts an input alternating current into an alternating current voltage signal and outputs the resultant signal. Here, the alternating current output from the second detection signal electrode 375a of the sensor element 3 to be described below is input to the charge amplifier 452 as a second detection signal. In addition, the first detection signal and the second detection signal have opposite phases from each other. The alternating current voltage signals output from the charge amplifiers 451 and 452 are respectively input to the differential amplification circuit 453.

The differential amplification circuit 453 differentially amplifies the alternating current voltage signal output from the charge amplifier 451 and the alternating current voltage signal output from the charge amplifier 452 to generate a differential amplification signal and outputs the differential amplification signal. The differential amplification signal output from the differential amplification circuit 453 is input to the AC amplification circuit 454.

The AC amplification circuit 454 amplifies the differential amplification signal output from the differential amplification circuit 453 and outputs the resultant differential amplification signal as an alternating current voltage signal. The alternating current voltage signal output from the AC amplification circuit 454 is input to the synchronous detection circuit 455.

The synchronous detection circuit 455 synchronously detects the alternating current voltage signal output from the AC amplification circuit 454 based on the alternating current voltage signal output from the AC amplification circuit 442 of the drive circuit 440 described above and extracts an angular velocity component. A signal of the angular velocity component extracted by the synchronous detection circuit 455 is smoothed into a direct current voltage signal by the smoothing circuit 456 and input to the variable amplification circuit 457.

The variable amplification circuit 457 amplifies or attenuates the direct current voltage signal output from the smoothing circuit 456 with a set amplification factor or attenuation factor to change angular velocity sensitivity. The signal amplified or attenuated by the variable amplification circuit 457 is input to the filter circuit 458.

The filter circuit 458 attenuates a high frequency noise component outside a sensor bandwidth from the signal output from the variable amplification circuit 457 to a predetermined level or less and outputs a detection signal of polarity and a voltage level according to a direction and magnitude of the angular velocity. The detection signal is output from an external output terminal (not illustrated) to an outside.

Vibration Element

Figure 5:
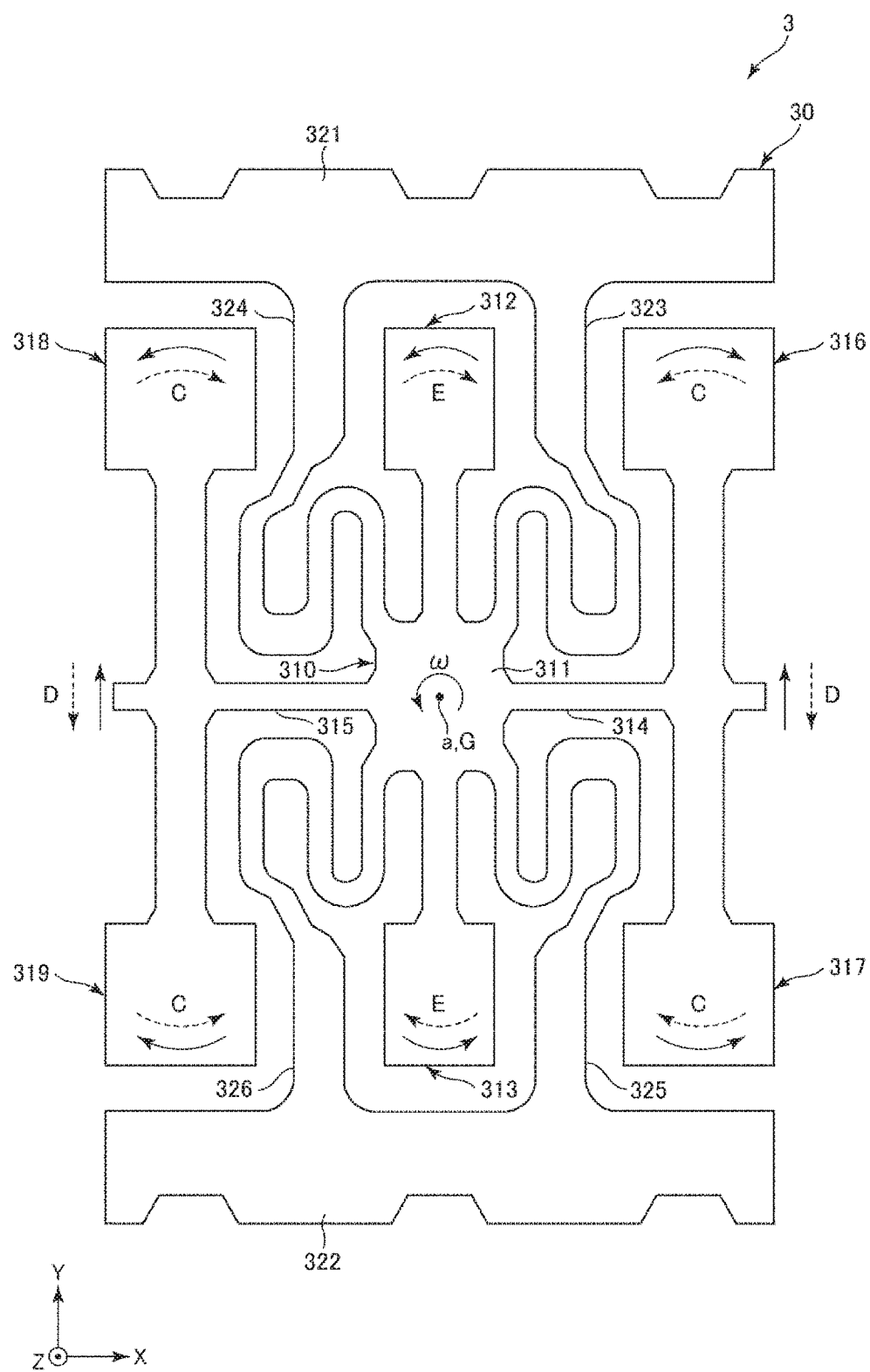
FIG. 5 is a plan view illustrating a sensor element according to the first embodiment.
Figure 6:
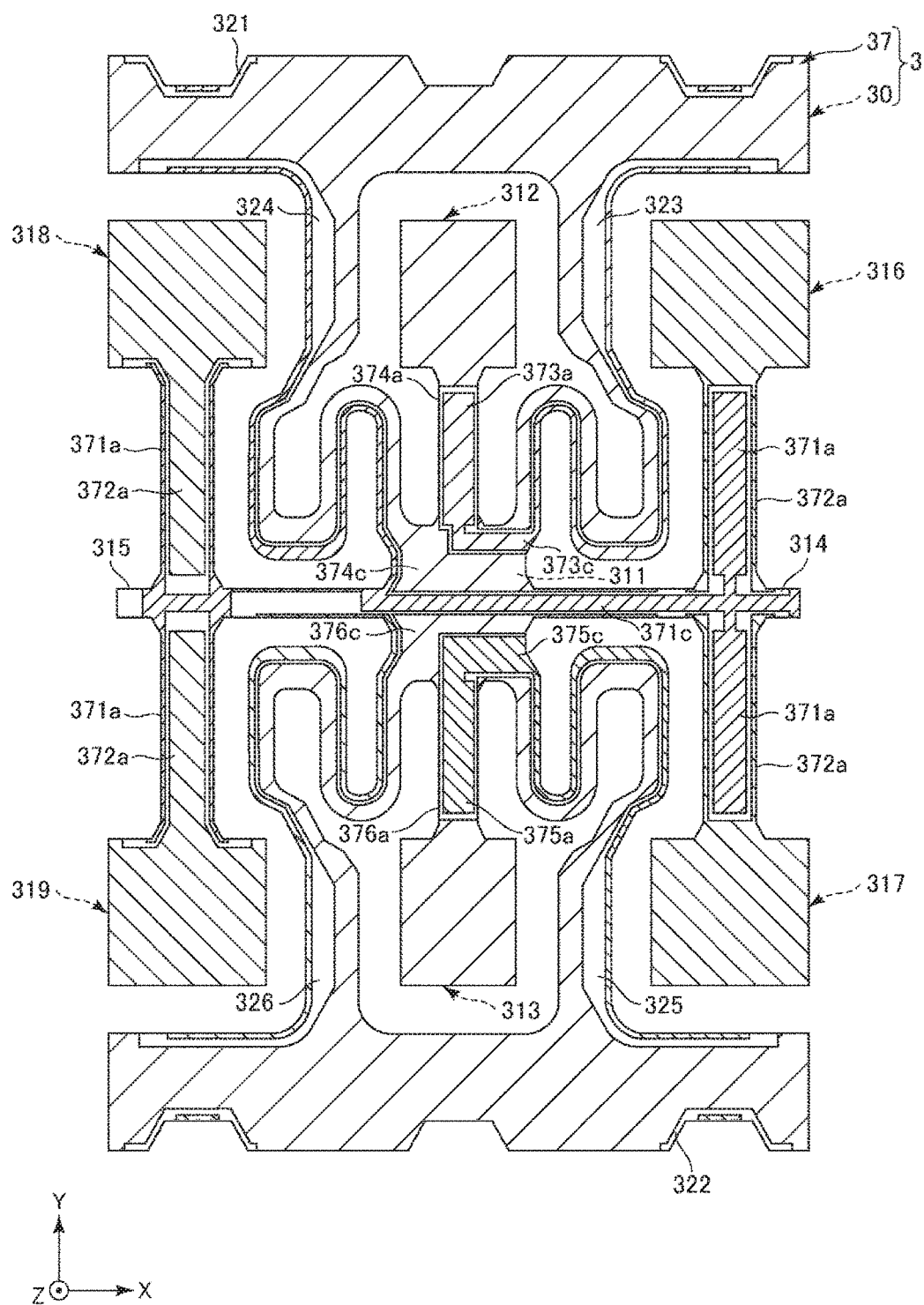
FIG. 6 is a plan view of an electrode pattern of the sensor element illustrated in FIG. 5 when seen from a +Z axis direction side.
Figure 7:
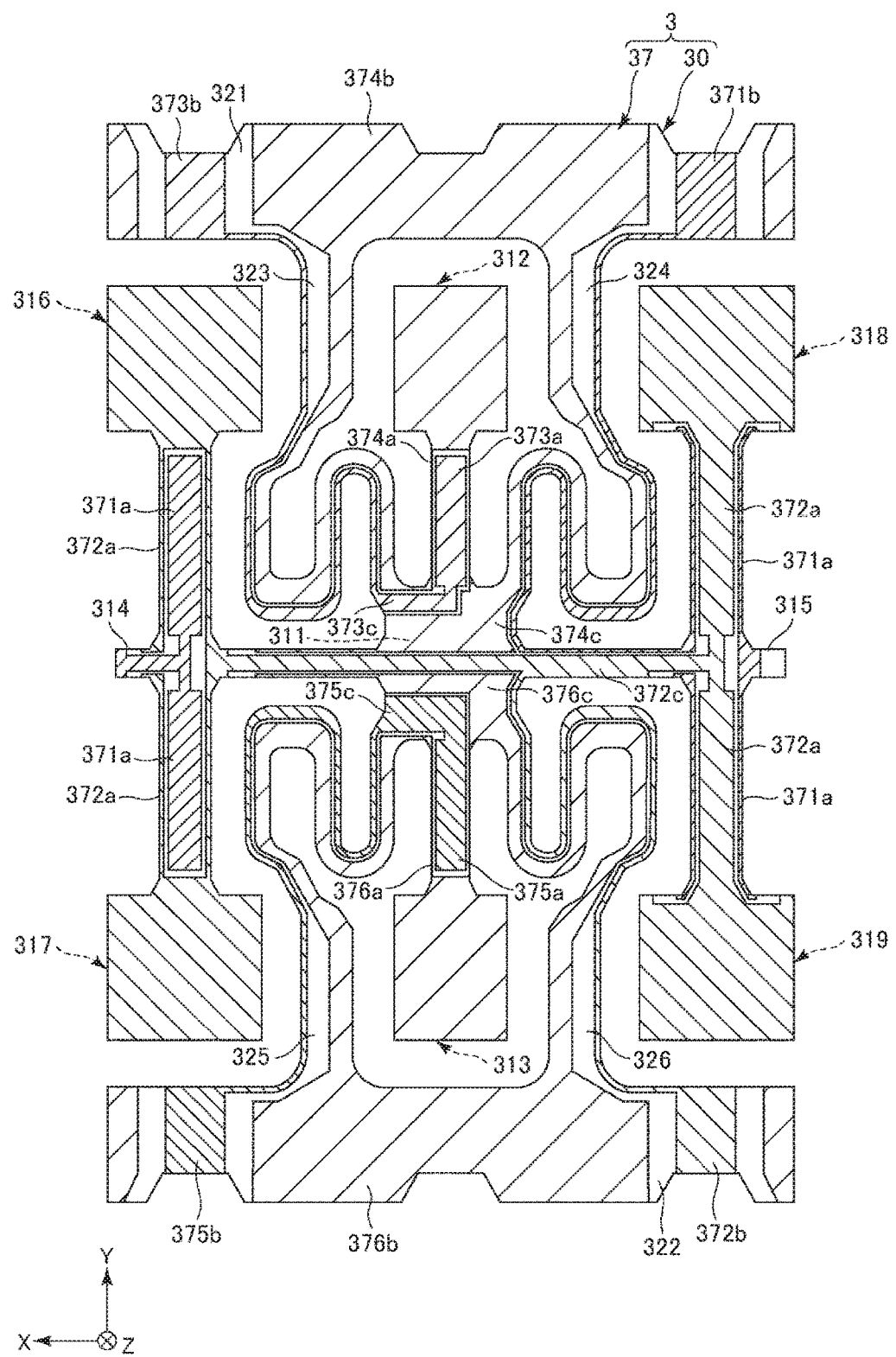
FIG. 7 is a plan view of the electrode pattern of the sensor element illustrated in FIG. 5 when seen from a −Z axis direction side.
Figure 8:
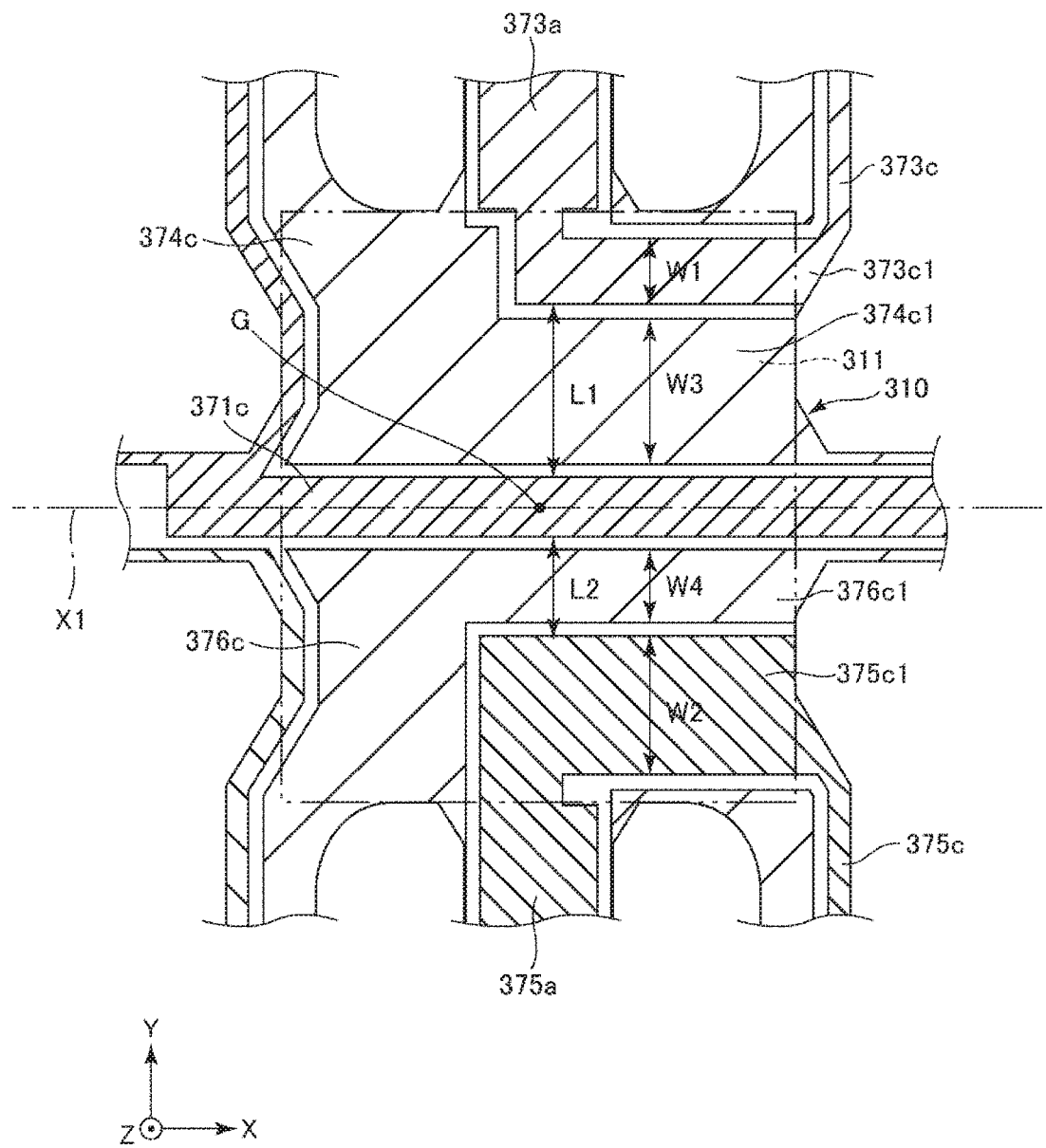
FIG. 8 is an enlarged plan view illustrating a drive signal wiring, and a first detection signal wiring and a second detection signal wiring of the sensor element illustrated in FIG. 6.

FIG. 5 is a plan view illustrating a sensor element according to the first embodiment. FIG. 6 is a plan view of an electrode pattern of the sensor element illustrated in FIG. 5 when seen from a +Z axis direction side. FIG. 7 is a plan view of the electrode pattern of the sensor element illustrated in FIG. 5 when seen from a −Z axis direction side. FIG. 8 is an enlarged plan view illustrating a drive signal wiring, and a first detection signal wiring and a second detection signal wiring of the sensor element illustrated in FIG. 6. In FIG. 5, for convenience of description, an electrode pattern 37 is not illustrated.

The sensor element 3 illustrated in FIG. 5 is a sensor element for detecting the angular velocity ω around the Z axis. The sensor element 3 includes a vibrator element 30 and the electrode pattern 37 provided on a surface of the vibrator element 30.

The vibrator element 30 includes a spread in an xy plane defined by the y axis as a mechanical axis which is a crystal axis of a quartz crystal substrate and the x axis as an electrical axis and has a plate shape having a thickness in a direction along the z axis as an optical axis. That is, the vibrator element 30 is configured by a z-cut quartz crystal plate. The z axis does not have to coincide with the thickness direction of the vibrator element 30, but the z axis may be slightly tilted with respect to the thickness direction in view of reducing a frequency change according to a temperature in the vicinity of an ordinary temperature. Specifically, the z-cut quartz crystal plate includes a quartz crystal plate of a cut angle so that a surface obtained by rotating a surface orthogonal to the z axis around at least one of the x axis and the y axis within a range from 0° or more to 10° or less is a main surface. A material of the vibrator element 30 is not limited to quartz crystal, but a piezoelectric material other than the quartz crystal, such as Lithium Tantalate and Lithium Niobate can also be used, for example. In addition, the vibrator element 30 may be made of silicon or the like not having a piezoelectric property, and in this case, a piezoelectric element may be appropriately provided on the vibrator element 30.

The vibrator element 30 has a structure referred to as a so-called double T type. That is, the vibrator element 30 includes a base portion 311, a pair of detection arms 312 and 313 extending from the base portion 311 to both sides in the Y axis direction, a pair of coupling arms 314 and 315 expending from the base portion 311 to both sides in the X axis direction, a pair of drive arms 316 and 317 extending from a tip portion of the coupling arm 314 to both sides in the Y axis direction, and a pair of drive arms 318 and 319 extending from a tip portion of the coupling arm 315 to both sides in the Y axis direction. Further, the vibrator element 30 includes a pair of supporting portions 321 and 322 for supporting the base portion 311, a pair of beam portions 323 and 324 for coupling the supporting portion 321 and the base portion 311, and a pair of beam portions 325 and 326 for coupling the supporting portion 322 and the base portion 311. Here, a base portion coupling body 310 is configured to include the base portion 311 and the coupling arms 314 and 315.

In addition, as illustrated, each of the detection arms 312, 313 and the drive arms 316, 317, 318, 319 has a shape having an arm portion of a constant width and a wide portion coupled to a tip of the arm portion and having a widened width, but each of the detection arms 312, 313 and the drive arms 316, 317, 318, 319 is not limited thereto and may be configured only by an arm portion of a constant width. Further, each of the detection arms 312 and 313 and the drive arms 316, 317, 318, and 319 may have a configuration in which a pair of bottomed grooves opening on an upper surface and a lower surface of each of the detection arms 312 and 313 and the drive arms 316, 317, 318, and 319 and extending in the Y axis direction are formed.

As illustrated in FIGS. 6 and 7, the electrode pattern 37 includes the drive signal electrode 371a, the drive fixed potential electrode 372a, the first detection signal electrode 373a, a first fixed potential electrode 374a, the second detection signal electrode 375a, a second fixed potential electrode 376a, a drive signal terminal 371b, a drive fixed potential terminal 372b, a first detection signal terminal 373b, a first fixed potential terminal 374b, a second detection signal terminal 375b, a second fixed potential terminal 376b, a drive signal wiring 371c, a drive fixed potential wiring 372c, a first detection signal wiring 373c, a first fixed potential wiring 374c, a second detection signal wiring 375c, a second fixed potential wiring 376c.

The drive signal electrode 371a is an electrode for exciting drive vibration of the drive arms 316, 317, 318, and 319. The drive signal electrodes 371a are respectively provided on upper and lower surfaces of arm portions of the drive arms 316 and 317 and are respectively provided on both side surfaces of arm portions of the drive arms 318 and 319. The drive signal electrode 371a is coupled to the drive signal terminal 371b via the drive signal wiring 371c. Here, the drive signal terminal 371b is provided, on a right side part in FIG. 7, on a lower surface of the supporting portion 321. In addition, the drive signal wiring 371c is provided along the base portion 311, the coupling arms 314 and 315, and the beam portion 324.

On the other hand, the drive fixed potential electrode 372a has a ground potential which is an example of a reference potential for the drive signal electrode 371a. The drive fixed potential electrodes 372a are respectively provided on both side surfaces of the arm portions of the drive arms 316 and 317 and are respectively provided on upper and lower surfaces of the arm portions of the drive arms 318 and 319. The drive fixed potential electrode 372a is coupled to the drive fixed potential terminal 372b via the drive fixed potential wiring 372c. Here, the drive fixed potential terminal 372b is provided, on the right side part in FIG. 7, on a lower surface of the supporting portion 322. In addition, the drive fixed potential wiring 372c is provided along the base portion 311, the coupling arms 314 and 315, and the beam portion 326.

The first detection signal electrode 373a and the second detection signal electrode 375a are electrodes for detecting a charge generated by detection vibration of the detection arms 312 and 313 when the detection vibration of the detection arms 312 and 313 is excited.

In the present embodiment, the first detection signal electrode 373a is provided on upper and lower surfaces of an arm portion of the detection arm 312 and outputs the charge generated by the detection vibration of the detection arm 312 as a first detection signal. The first detection signal electrode 373a is coupled to the first detection signal terminal 373b via the first detection signal wiring 373c. Here, the first detection signal terminal 373b is provided, on a left side part in FIG. 7, on the lower surface of the supporting portion 321. In addition, the first detection signal wiring 373c is provided along the base portion 311 and the beam portion 323.

In addition, the second detection signal electrode 375a is provided on upper and lower surfaces of an arm portion of the detection arm 313 and outputs the charge generated by the detection vibration of the detection arm 313 as a second detection signal. The second detection signal electrode 375a is coupled to the second detection signal terminal 375b via the second detection signal wiring 375c. Here, the second detection signal terminal 375b is provided, on the left side part in FIG. 7, on the lower surface of the supporting portion 322. In addition, the second detection signal wiring 375c is provided along the base portion 311 and the beam portion 325.

On the other hand, the first fixed potential electrode 374a and the second fixed potential electrode 376a have ground potentials which are examples of reference potentials for the first detection signal electrode 373a and the second detection signal electrode 375a.

The first fixed potential electrodes 374a are provided on both side surfaces of the arm portion of the detection arm 312. The first fixed potential electrode 374a is coupled to the first fixed potential terminal 374b via the first fixed potential wiring 374c. Here, the first fixed potential terminal 374b is provided, on a middle part in FIG. 7, on the lower surface of the supporting portion 321. In addition, the first fixed potential wiring 374c is provided along the base portion 311 and the beam portions 323 and 324.

Further, the second fixed potential electrodes 376a are provided on both side surfaces of the arm portion of the detection arm 313. The second fixed potential electrode 376a is coupled to the second fixed potential terminal 376b via the second fixed potential wiring 376c. Here, the second fixed potential terminal 376b is provided, on the middle part in FIG. 7, on the lower surface of the supporting portion 322. In addition, the second fixed potential wiring 376c is provided along the base portion 311 and the beam portions 325 and 326.

A component material of the electrode pattern 37 is not particularly limited as long as the component material has conductivity. For example, the electrode pattern 37 can be configured by a metal film, on which each of films such as Ni (nickel), Au (gold), Ag (silver), Cu (copper), and the like is laminated, with a metallization layer of Cr (chromium), W (tungsten), or the like as an underlayer.

In the electrode pattern 37, as illustrated in FIG. 8, shapes of the first detection signal wiring 373c and the second detection signal wiring 375c are different from line symmetrical shapes based on a line segment X1 (first axis). Here, as compared with a case where the shapes of the first detection signal wiring 373c and the second detection signal wiring 375c are the line symmetrical shapes based on the line segment X1 (first axis), the shapes of the first detection signal wiring 373c and the second detection signal wiring 375c are adjusted so as to reduce a difference of a capacity (hereinafter, also simply referred to as "first capacity") between the drive signal wiring 371c and the first detection signal wiring 373c and a capacity (hereinafter, also simply referred to as "second capacity") between the drive signal wiring 371c and the second detection signal wiring 375c. Accordingly, it is possible to reduce a difference between magnitude of a noise mixed from the drive signal wiring 371c with the first detection signal wiring 373c and magnitude of a noise mixed from the drive signal wiring 371c with the second detection signal wiring 375c. Hereinafter, this point will be described in detail below. Note that "capacity" in the present disclosure indicates a capacitance.

As illustrated in FIG. 8, the drive signal wiring 371c is disposed on the base portion 311, mainly along the line segment X1 (first axis) passing through a center G of the base portion 311 which is a rectangular shape parallel to the X axis. In the present embodiment, on the base portion 311, the drive signal wiring 371c includes a portion (hereinafter, also referred to as "constant width portion") having a line symmetrical shape based on the line segment X1, extending with a constant width in the X axis direction in a plan view. In FIG. 8, an area surrounded by a chain double-dashed line is the base portion 311.

Meanwhile, since the drive signal wiring 371c is withdrawn onto the beam portion 324 as described above, an entire shape of the drive signal wiring 371c is not line symmetrical based on the line segment X1 in a plan view. Here, the drive signal wiring 371c is withdrawn from the base portion 311 onto the beam portion 324 closer to the first detection signal wiring 373c than the second detection signal wiring 375c. For this reason, if the shapes of the first detection signal wiring 373c and the second detection signal wiring 375c are the line symmetrical shapes based on the line segment X1, the first capacity which is the capacity between the drive signal wiring 371c and the first detection signal wiring 373c becomes larger than the second capacity which is the capacity between the drive signal wiring 371c and the second detection signal wiring 375c.

In the constant width portion of the drive signal wiring 371c, the first detection signal wiring 373c is disposed, on an upper side in FIG. 8, on one side and the second detection signal wiring 375c is disposed, on a lower side in FIG. 8, on the other side.

The first detection signal wiring 373c and the second detection signal wiring 375c are respectively separated apart from the drive signal wiring 371c on the base portion 311 and have portions extending in the X axis direction in a plan view. Here, a width W1 which is a length of a first detection signal wiring extension portion 373c1 in the Y axis direction which is a portion extending along the X axis direction of the first detection signal wiring 373c on the base portion 311 is smaller than a width W2 which is a length of a second detection signal wiring extension portion 375c1 in the Y axis direction which is a portion extending along the X axis direction of the second detection signal wiring 375c on the base portion 311. Accordingly, a distance L1 between the constant width portion of the drive signal wiring 371c and the first detection signal wiring 373c becomes larger than a distance L2 between the constant width portion of the drive signal wiring 371c and the second detection signal wiring 375c. For this reason, in order to cancel or reduce a capacitance difference caused by asymmetry of the shape of the drive signal wiring 371c described above, it is possible to make a capacity between the constant width portion of the drive signal wiring 371c and the first detection signal wiring 373c smaller than a capacity between the constant width portion of the drive signal wiring 371c and the second detection signal wiring 375c. As a result, it is possible to reduce a difference between the first capacity and the second capacity.

In addition, between the drive signal wiring 371c and the first detection signal wiring 373c, the first fixed potential wiring 374c is disposed on the base portion 311 so as to be separated from these wirings and fill in a gap between these wirings. In a same manner, between the drive signal wiring 371c and the second detection signal wiring 375c, the second fixed potential wiring 376c is disposed on the base portion 311 so as to be separated from these wirings and fill in a gap between these wirings. Here, a width W3 which is a length of a first fixed potential wiring extension portion 374c1 in the Y axis direction which is a portion of the first fixed potential wiring 374c between the drive signal wiring 371c and the first detection signal wiring 373c on the base portion 311 is larger than a width W4 which is a length of a second fixed potential wiring extension portion 376c1 in the Y axis direction which is a portion of the second fixed potential wiring 376c between the drive signal wiring 371c and the second detection signal wiring 375c on the base portion 311. Accordingly, it is possible to make an electromagnetic shielding property between the constant width portion of the drive signal wiring 371c and the first detection signal wiring 373c higher than an electromagnetic shielding property between the constant width portion of the drive signal wiring 371c and the second detection signal wiring 375c. For this reason, also in this configuration, it is possible to make the capacity between the constant width portion of the drive signal wiring 371c and the first detection signal wiring 373c smaller than the capacity between the constant width portion of the drive signal wiring 371c and the second detection signal wiring 375c.

Returning to FIG. 5, in the sensor element 3, by inputting a drive signal to the drive signal terminal 371b in a state in which the angular velocity ω is not applied to the sensor element 3, when an electric field occurs between the drive signal electrode 371a and the drive fixed potential electrode 372a, each of the drive arms 316, 317, 318, and 319 performs flexural vibration in a direction indicated by an arrow C in FIG. 5 as drive vibration. At this time, since the drive arms 316 and 317 and the drive arms 318 and 319 perform vibration of bilateral symmetry in FIG. 5, the base portion 311 and the detection arms 312 and 313 hardly vibrate.

When the angular velocity ω around a central axis a along the Z axis is applied to the sensor element 3 in a state where the drive vibration is performed, the detection vibration is excited. Specifically, a Coriolis force in a direction indicated by an arrow D in FIG. 5 is applied to the drive arms 316, 317, 318, and 319 and the coupling arms 314 and 315, and new vibration is excited. As a result, detection vibration in a direction indicated by an arrow E in FIG. 5 is excited on the detection arms 312 and 313 so as to cancel the vibration of the coupling arms 314 and 315. A charge generated by the detection vibration in the detection arms 312 and 313 is obtained as a detection signal from the first detection signal electrode 373a and the second detection signal electrode 375a, and the angular velocity ω is obtained based on the detection signal.

As described above, the sensor element 3 includes the base portion 311, the drive arms 316, 317, 318, and 319 coupled from the base portion 311 via the coupling arms 314 and 315 extending over the line segment X1 as the first axis in a plan view of the base portion 311 in a thickness direction, the detection arm 312 as a first detection arm extending in the +Y axis direction as a positive direction of the second axis orthogonal to the first axis in a plan view from the base portion 311 and the detection arm 313 as a second detection arm extending in the −Y axis direction as a negative direction of the second axis, the drive signal wiring 371c disposed on the base portion 311 in a plan view, the first detection signal wiring 373c disposed on the base portion 311 in a plan view, and the second detection signal wiring 375c disposed on the base portion 311 in a plan view.

Here, the drive signal wiring 371c is disposed on the base portion 311 along the line segment X1 in a plan view and transmits a drive signal for vibrating the drive arms 316, 317, 318, and 319. The first detection signal wiring 373c transmits the detection signal output in accordance with vibration of the detection arm 312 as the first detection arm. The second detection signal wiring 375c transmits the detection signal output in accordance with vibration of the detection arm 313 as the second detection arm.

The shapes of the first detection signal wiring 373c and the second detection signal wiring 375c are different from line symmetrical shapes based on the line segment X1 as the first axis in a plan view so as to reduce a difference of the first capacity between the drive signal wiring 371c and the first detection signal wiring 373c and the second capacity between the drive signal wiring 371c and the second detection signal wiring 375c.

According to the sensor element 3, since the shapes of the first detection signal wiring 373c and the second detection signal wiring 375c are different from line symmetrical shapes based on the line segment X1 in a plan view so as to reduce the difference between the first capacity and the second capacity, it is possible to reduce a difference between the magnitude of the noise mixed from the drive signal wiring 371c with the first detection signal wiring 373c and the magnitude of the noise mixed from the drive signal wiring 371c with the second detection signal wiring 375c. For this reason, the detection circuit 450 differentially amplifies the first detection signal output from the first detection signal wiring 373c and the second detection signal output from the second detection signal wiring 375c by using the differential amplification circuit 453 which is a simple circuit, it is possible to cancel or reduce a noise included in these detection signals. As a result, it is possible to increase an S/N ratio and to provide the sensor element 3 with high accuracy.

Here, the first detection signal wiring 373c includes the first detection signal wiring extension portion 373c1 which is coupled to the first detection signal electrode 373a disposed on the detection arm 312 as the first detection arm and which extents along the line segment X1 as the first axis on the base portion 311. The second detection signal wiring 375c includes the second detection signal wiring extension portion 375c1 which is coupled to the second detection signal electrode 375a disposed on the detection arm 313 as the second detection arm and which extents along the line segment X1 as the first axis on the base portion 311. In this manner, by withdrawing the first detection signal wiring 373c and the second detection signal wiring 375c from the different detection arms onto the base portion 311, the drive signal wiring 371c is positioned between the first detection signal wiring 373c and the second detection signal wiring 375c on the base portion 311. For this reason, by adjusting widths or lengths of these detection signal wirings, it is possible to reduce the difference between the first capacity and the second capacity.

In the present embodiment, the distance L1 between the drive signal wiring 371c and the first detection signal wiring extension portion 373c1 and the distance L2 between the drive signal wiring 371c and the second detection signal wiring extension portion 375c1 are different from each other. In the present embodiment, the distance L1 is larger than the distance L2. Accordingly, it is possible to adjust the difference between the first capacity and the second capacity.

In addition, the drive signal wiring 371c has a line symmetrical shape based on the line segment X1 as the first axis in an area between the first detection signal wiring 373c and the second detection signal wiring 375c in a plan view. Accordingly, it becomes easy to design the drive signal wiring 371c, the first detection signal wiring 373c, and the second detection signal wiring 375c.

Further, the sensor element 3 includes the first fixed potential wiring 374c coupled to a fixed potential and the second fixed potential wiring 376c coupled to a fixed potential. The first fixed potential wiring 374c includes the first fixed potential wiring extension portion 374c1 which is coupled to the first fixed potential electrode 374a disposed on the detection arm 312 as the first detection arm and which extents along the line segment X1 as the first axis on the base portion 311. The second fixed potential wiring 376c includes the second fixed potential wiring extension portion 376c1 which is coupled to the second fixed potential electrode 376a disposed on the detection arm 313 as the second detection arm and which extents along the line segment X1 as the first axis on the base portion 311. Shapes of the first fixed potential wiring extension portion 374c1 and the second fixed potential wiring extension portion 376c1 are different from line symmetrical shapes based on the line segment X1 as the first axis in a plan view. Accordingly, it is possible to adjust the difference between the first capacity and the second capacity by making the electromagnetic shielding property of these fixed potential wires different.

In the present embodiment, the first fixed potential wiring extension portion 374c1 includes a first portion positioned between the drive signal wiring 371c and the first detection signal wiring extension portion 373c1 on the base portion 311. The second fixed potential wiring extension portion 376c1 includes a second portion positioned between the drive signal wiring 371c and the second detection signal wiring extension portion 375c1 on the base portion 311. The width 3w of the first portion and the width 4w of the second portion are different from each other. Since the widths of the first portion and the second portion are different from each other, it is possible to easily adjust the difference between the first capacity and the second capacity. As the third embodiment to be described below, since lengths of the first portion and the second portion are different from each other, it is possible to easily adjust the difference between the first capacity and the second capacity. That is, as long as the first fixed potential wiring 374c and the second fixed potential wiring 376c are formed so that at least one of that the width 3w of the first portion and the width 4w of the second portion are different from each other or that a length of the first portion and a length of the second portion are different from each other is satisfied, the effect described above can be obtained.

In addition, the physical quantity sensor 1 includes the sensor element 3 and the circuit element 4 as a control circuit which outputs a drive signal to the sensor element 3 and to which a detection signal is input. According to the physical quantity sensor 1, since the physical quantity sensor 1 has the sensor element 3 with high sensitivity, it is possible to provide the physical quantity sensor 1 with high sensitivity.

Relay Substrate

Figure 9:
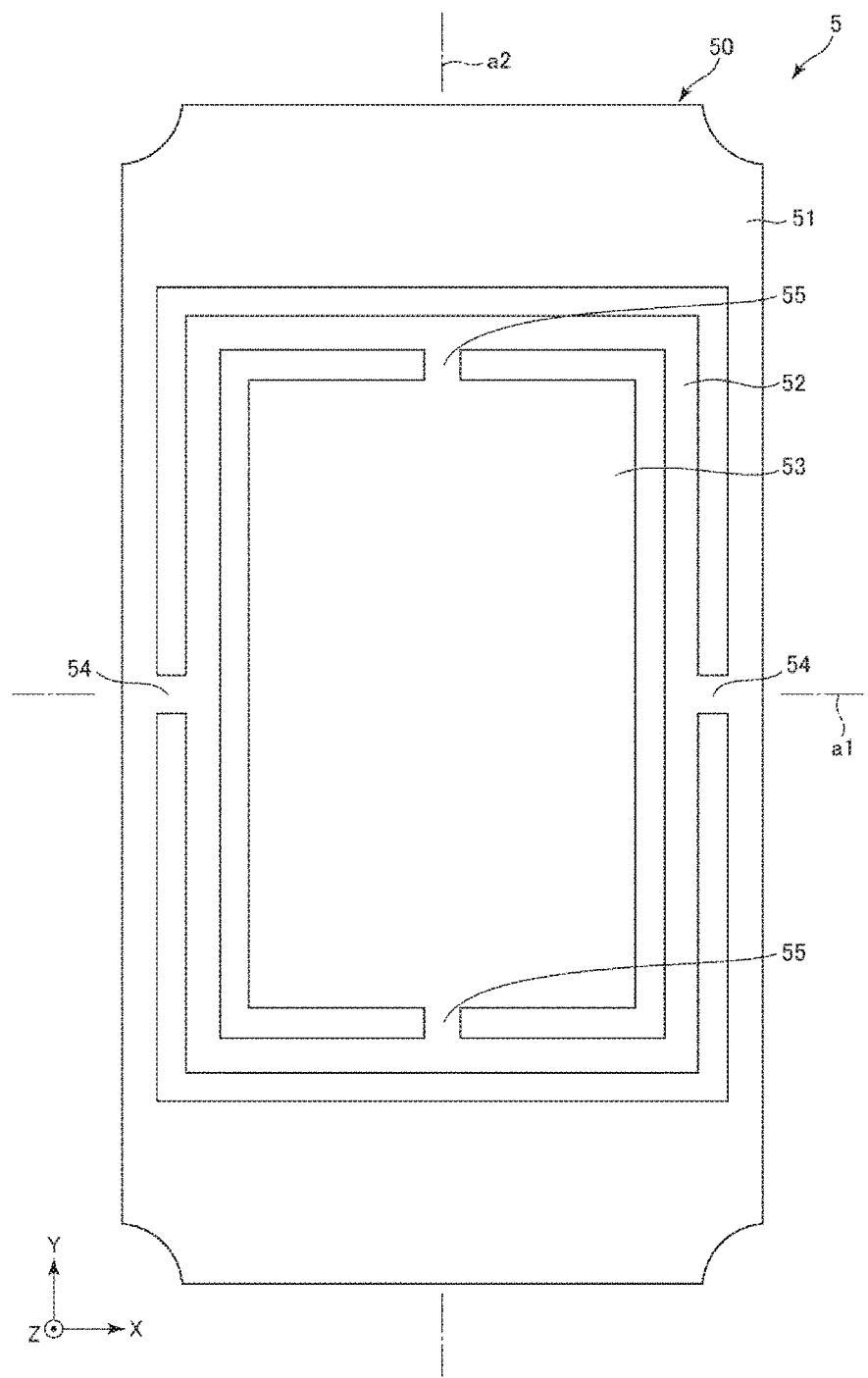
FIG. 9 is a plan view illustrating a relay substrate according to the first embodiment.
Figure 10:
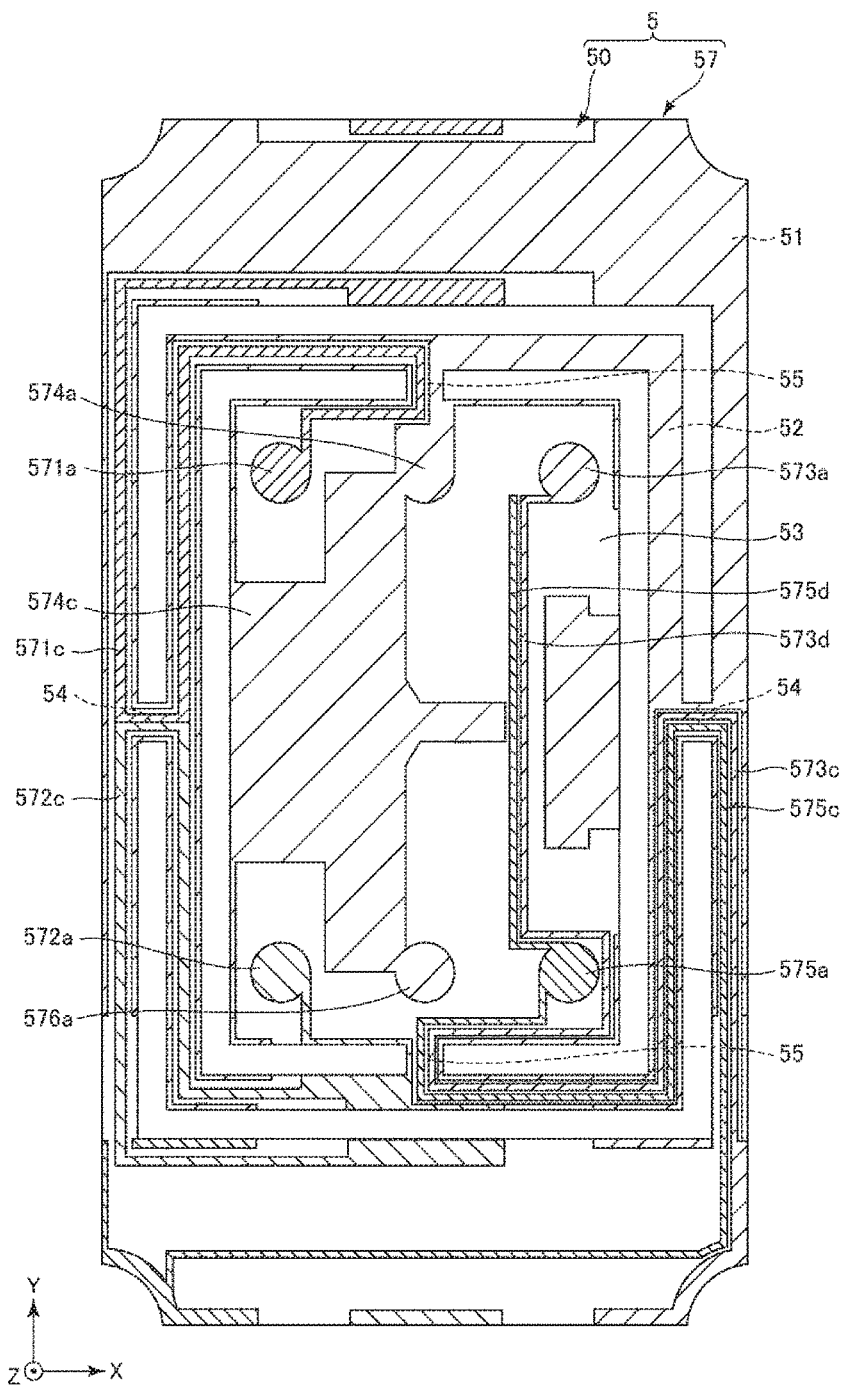
FIG. 10 is a plan view of an electrode pattern of the relay substrate illustrated in FIG. 9 when seen from the +Z axis direction side.
Figure 11:
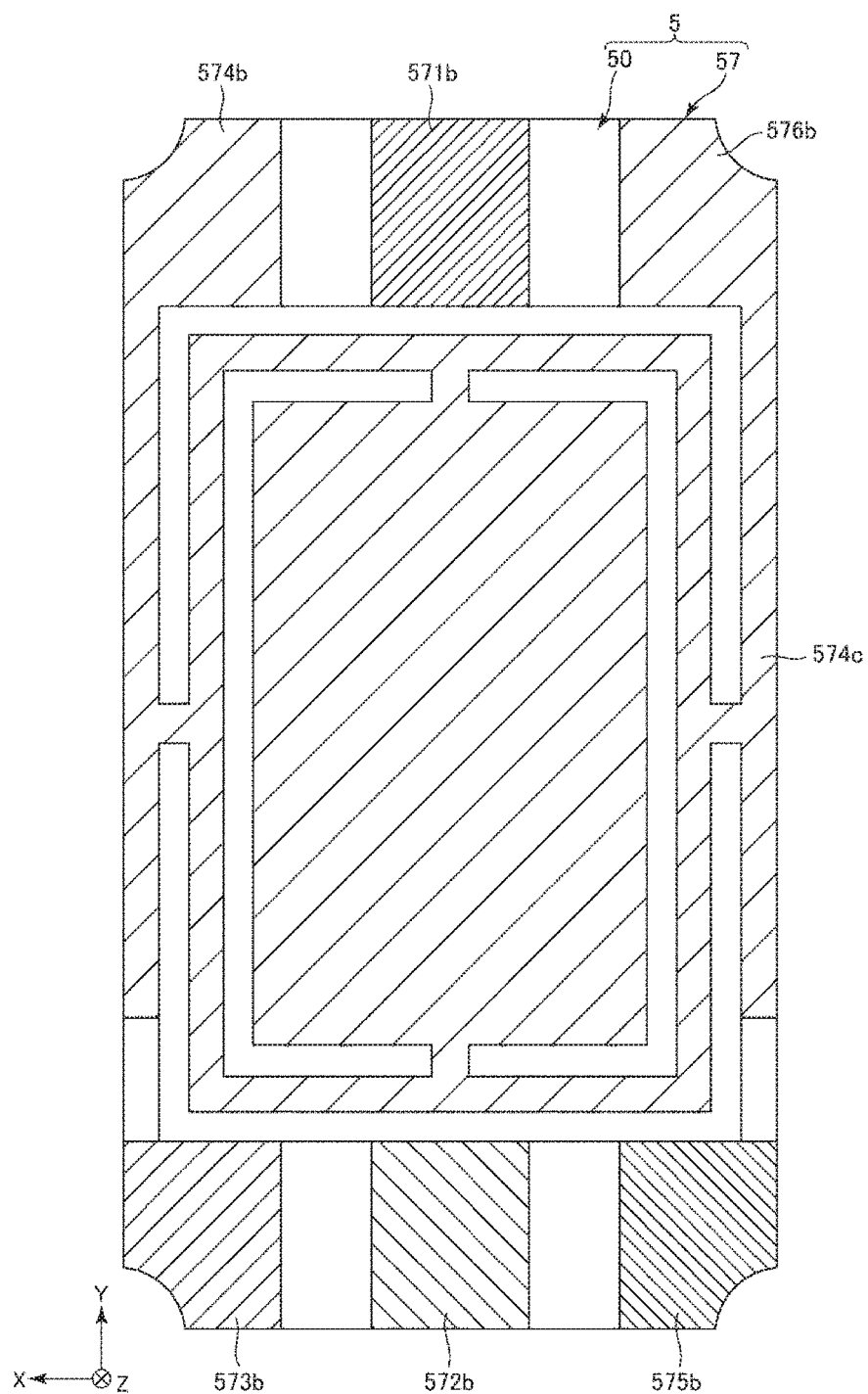
FIG. 11 is a plan view of the electrode pattern of the relay substrate illustrated in FIG. 9 when seen from the −Z axis direction side.
Figure 12:
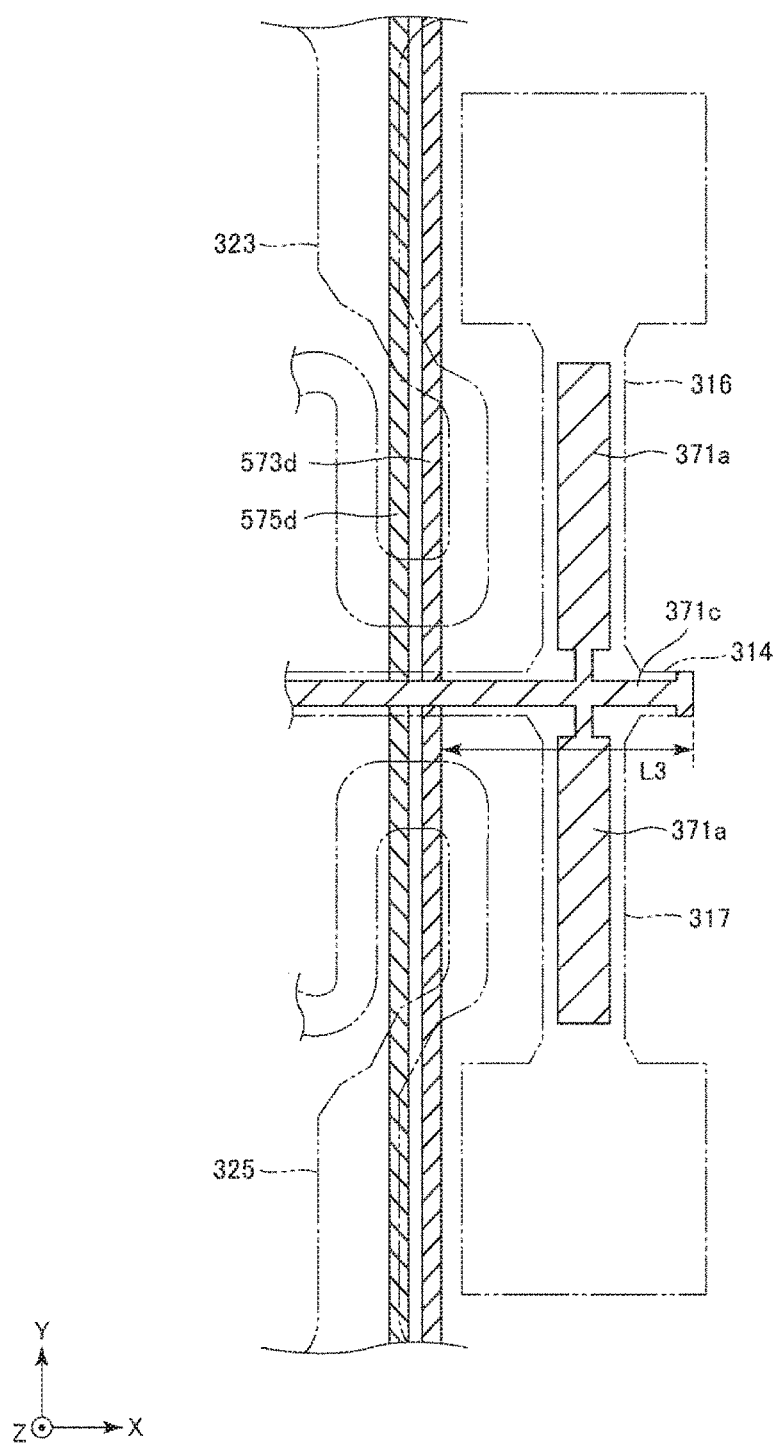
FIG. 12 is a diagram illustrating a positional relationship between the drive signal wiring of the sensor element illustrated in FIG. 6 and a first detection signal wiring and a second detection signal wiring of the relay substrate illustrated in FIG. 10.
Figure 13:
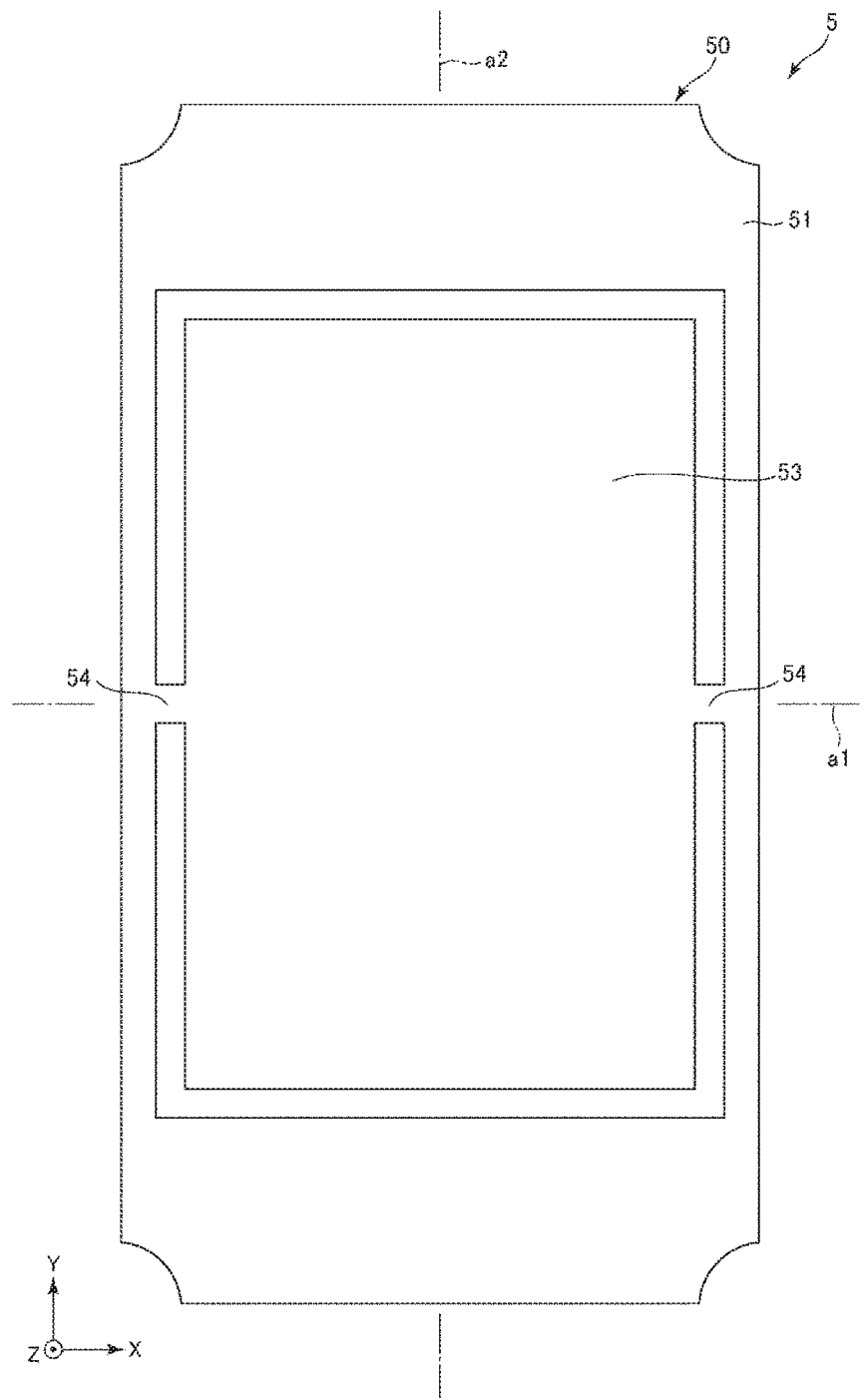
FIG. 13 is a plan view illustrating a modification example of the relay substrate.

FIG. 9 is a plan view illustrating a relay substrate according to the first embodiment. FIG. 10 is a plan view of an electrode pattern of the relay substrate illustrated in FIG. 9 when seen from the +Z axis direction side. FIG. 11 is a plan view of the electrode pattern of the relay substrate illustrated in FIG. 9 when seen from the −Z axis direction side. FIG. 12 is a diagram illustrating a positional relationship between the drive signal wiring of the sensor element illustrated in FIG. 6 and a first detection signal wiring and a second detection signal wiring of the relay substrate illustrated in FIG. 10. FIG. 13 is a plan view illustrating a modification example of the relay substrate.

As illustrated in FIGS. 9 to 11, the relay substrate 5, which is an example of a supporting member, includes a substrate 50 and an electrode pattern 57 provided on the substrate 50.

As illustrated in FIG. 9, the substrate 50 has a gimbal shape. That is, the substrate 50 includes a first portion 51 in a frame shape, a second portion 52 in a frame shape disposed inside the first portion 51, a third portion 53 which is a substrate disposed inside the second portion 52, a pair of first beam portions 54 which swingably support the second portion 52 around an axis a1 parallel to the X axis from the first portion 51, and a pair of second beam portions 55 which swingably support the third portion 53 around an axis a2 parallel to the Y axis from the second portion 52. Here, the first portion 51, the second portion 52, the third portion 53, the first beam portion 54, and the second beam portion 55 are integrally configured.

In a plan view, the first portion 51 has a rectangular shape of which outer and inner peripheries are in the Y axis direction as a longitudinal direction and is disposed to overlap with the plurality of terminals 261, 262, 263, 264, 265, and 266 of the package 2 illustrated in FIG. 3 described above. In a plan view, the second portion 52 has a shape of which an outer periphery and an inner periphery are along the inner periphery of the first portion 51, that is, a rectangular shape and is disposed to be separated from the first portion 51, inside the first portion 51. In a plan view, the third portion 53 has a shape of which an outer periphery is along the inner periphery of the second portion 52, that is, a rectangular shape and is disposed to be separated from the second portion 52, inside the second portion 52. In a plan view, the first beam portion 54 is disposed between the first portion 51 and the second portion 52 to be a shape extending along the axis a1 and couples the first portion 51 and the second portion 52. In a plan view, the second beam portion 55 is disposed between the second portion 52 and the third portion 53 to be a shape extending along the axis a2 and couples the second portion 52 and the third portion 53.

In this substrate 50, the second portion 52 is swingable around the axis a1 from the first portion 51 according to elastic deformation of the first beam portion 54 and the third portion 53 is swingable around the axis a2 from the second portion 52 according to elastic deformation of the second beam portion 55. Therefore, the third portion 53 is swingable around both axes of the axis a1 and the axis a2 from the first portion 51.

A shape of each part of the substrate 50 is not limited to the illustrated shape. For example, the outer periphery and the inner periphery of the first portion 51, the second portion 52, and the third portion 53 in a plan view may respectively have other polygonal shapes such as a square shape, a hexagonal shape, and the like. In addition, each of the first beam portion 54 and the second beam portion 55 may have a bent or branched portion in a middle or may be disposed at a position shifted from the axis a1 or the axis a2. Further, the substrate 50 may not have a gimbal shape. For example, as illustrated in FIG. 13, the substrate 50 may have one plate shape in which the second beam portion 55 described above is omitted and the second portion 52 and the third portion 53 are integrated or may be a single plate.

A component material of the substrate 50 is not particularly limited, and a material having a coefficient of linear expansion close to that of the component material of the vibrator element 30 of the sensor element 3 may be used, specifically, quartz crystal may be used. Accordingly, it is possible to reduce a stress generated in the sensor element 3 due to a difference in a coefficient of linear expansion between the vibrator element 30 and the substrate 50. Specifically, in a case where the substrate 50 is configured by quartz crystal, the substrate 50 may include a spread in the xy plane defined by the Y axis as a mechanical axis which is a crystal axis of a quartz crystal substrate and the X axis as an electrical axis and may have a plate shape having a thickness in a direction along the Z axis as an optical axis. That is, the substrate 50 may be configured by a z-cut quartz crystal plate. Accordingly, it is possible to easily obtain the substrate 50 having high dimensional accuracy by using wet etching. The z-cut quartz crystal plate includes a quartz crystal plate of a cut angle so that a surface obtained by rotating a surface orthogonal to the Z axis around at least one of the X axis and the Y axis within a range from 0° to 10° is a main surface.

The electrode pattern 57 is provided on a surface of the substrate 50. As illustrated in FIGS. 10 and 11, the electrode pattern 57 includes a drive signal terminal 571a, a drive fixed potential terminal 572a, a first detection signal terminal 573a, a first fixed potential terminal 574a, a second detection signal terminal 575a, and a second fixed potential terminal 576a disposed on an upper surface of the third portion 53 of the substrate 50, a drive signal terminal 571b, a drive fixed potential terminal 572b, a first detection signal terminal 573b, a first fixed potential terminal 574b, a second detection signal terminal 575b, and the second fixed potential terminal 576b provided on a lower surface of the first portion 51 of the substrate 50, and a drive signal wiring 571c, the drive fixed potential wiring 572c, a first detection signal wiring 573c, a fixed potential wiring 574c, and a second detection signal wiring 575c appropriately coupling the terminals on a side of the upper surface and aside of the lower surface of the substrate 50.

The drive signal terminal 571a, the drive fixed potential terminal 572a, the first detection signal terminal 573a, the first fixed potential terminal 574a, the second detection signal terminal 575a, the second fixed potential terminal 576a are disposed at positions corresponding to the drive signal terminal 371b, the drive fixed potential terminal 372b, the first detection signal terminal 373b, the first fixed potential terminal 374b, the second detection signal terminal 375b, and the second fixed potential terminal 376b of the sensor element 3 described above and are respectively coupled to the corresponding terminals via a joining material 61 illustrated in FIG. 2. As the joining material 61, any material may be used as long as the material has conductivity and can join the terminals to each other, and a conductive adhesive may be used, but a metal bump may be used as described below.

On the other hand, the drive signal terminal 571b, the drive fixed potential terminal 572b, the first detection signal terminal 573b, the first fixed potential terminal 574b, the second detection signal terminal 575b, and the second fixed potential terminal 576b are disposed at positions corresponding to the terminals 261, 262, 263, 264, 265, and 266 of the package 2 described above and are respectively coupled to the corresponding terminals via a joining material 62 illustrated in FIG. 2. As the joining material 62, any material may be used as long as the material has conductivity and can join joining the terminals to each other, and a conductive adhesive may be used and a metal bump may be used.

The drive signal wiring 571c couples the drive signal terminal 571a and the drive signal terminal 571b. The drive signal wiring 571c is led from above the third portion 53 onto the first portion 51 via upper sides of the second beam portion 55 and the second portion 52 on an upper side in FIG. 10 and an upper side of the first beam portion 54 on a left side in FIG. 10. Here, the drive signal wiring 571c is disposed on an upper surface of the substrate 50 except for a coupled part with the drive signal terminal 571b, and is not disposed on a lower surface of the substrate 50.

On the other hand, the drive fixed potential wiring 572c couples the drive fixed potential terminal 572a and the drive fixed potential terminal 572b. The drive fixed potential wiring 572c is led from above the third portion 53 onto the first portion 51 via upper sides of the second beam portion 55 and the second portion 52 on a lower side in FIG. 10 and an upper side of the first beam portion 54 on a left side in FIG. 10. Here, the drive fixed potential wiring 572c is disposed on the upper surface of the substrate 50 except for a coupled part with the drive fixed potential terminal 572b, and is not disposed on the lower surface of the substrate 50.

The first detection signal wiring 573c couples the first detection signal terminal 573a and the first detection signal terminal 573b. The first detection signal wiring 573c is led from above the third portion 53 onto the first portion 51 via upper sides of the second beam portion 55 and the second portion 52 on a lower side in FIG. 10 and an upper side of the first beam portion 54 on a right side in FIG. 10. In this manner, by passing the first detection signal wiring 573c over the first beam portion 54 and the second beam portion 55 different from the drive signal wiring 571c, it is possible to reduce a noise being mixed from the drive signal wiring 571c with the first detection signal wiring 573c. Here, the first detection signal wiring 573c is disposed on the upper surface of the substrate 50 except for a coupled part with the first detection signal terminal 573b, and is not disposed on the lower surface of the substrate 50. In addition, the first detection signal wiring 573c includes a portion 573d extending in the Y axis direction on the third portion 53.

In the same manner, the second detection signal wiring 575c couples the second detection signal terminal 575a and the second detection signal terminal 575b. The second detection signal wiring 575c is led from above the third portion 53 onto the first portion 51 via upper sides of the second beam portion 55 and the second portion 52 on a lower side in FIG. 10 and an upper side of the first beam portion 54 on a right side in FIG. 10. In this manner, by passing the second detection signal wiring 575c over the first beam portion 54 and the second beam portion 55 different from the drive signal wiring 571c, it is possible to reduce a noise being mixed from the drive signal wiring 571c with the second detection signal wiring 575c. Here, the second detection signal wiring 575c is disposed on the upper surface of the substrate 50 except for a coupled part with the second detection signal terminal 575b, and is not disposed on the lower surface of the substrate 50. In addition, the second detection signal wiring 575c includes a portion 575d extending in the Y axis direction in parallel with the portion 573d on the third portion 53.

The fixed potential wiring 574c couples the first fixed potential terminal 574a and the second fixed potential terminal 576a, and the first fixed potential terminal 574b and the second fixed potential terminal 576b. The fixed potential wiring 574c is led from above the third portion 53 onto the first portion 51 via upper sides of the second beam portion 55, the second portion 52, and the first beam portion 54. Here, the fixed potential wiring 574c is disposed so as to be separated from the other wiring and terminal described above and fill a gap between the other wiring and the terminal. For this reason, the fixed potential wiring 574c is disposed over an entire area of a lower surface of the third portion 53. Accordingly, it is possible to shield a noise from the package 2 or the circuit element 4 to the sensor element 3 by the fixed potential wiring 574c. The fixed potential wiring 574c is electrically coupled to a fixed potential, for example, a ground potential.

A component material of the electrode pattern 57 is not particularly limited as long as the component material has conductivity. For example, the electrode pattern 57 can be configured by a metal film, on which each of films such as Ni (nickel), Au (gold), Ag (silver), Cu (copper), and the like is laminated, with a metallization layer of Cr (chromium), W (tungsten), or the like as an underlayer. The shapes of the wires and the terminals included in the electrode pattern 57 are not limited to the illustrated shapes.

The package 2 is joined to the first portion 51 of the relay substrate 5 described above via the joining material 62 illustrated in FIG. 2, and the sensor element 3 is joined to the third portion 53 of the relay substrate 5 via the joining material 61 illustrated in FIG. 2. In this manner, by joining the package 2 and the sensor element 3 to the substrate 50 in a gimbal shape, it is possible to effectively reduce a stress being transmitted from the package 2 to the sensor element 3.

In a state in which the sensor element 3 is mounted on the relay substrate 5, as illustrated in FIG. 12, the drive signal wiring 371c of the sensor element 3 intersects with both of the portion 573d of the first detection signal wiring 573c and the portion 575d of the second detection signal wiring 575c of the relay substrate 5 when seen in the Z axis direction. Accordingly, it is possible to reduce a difference between a quantity of a noise mixed from the drive signal wiring 371c with the first detection signal wiring 573c and a quantity of a noise mixed from the drive signal wiring 371c with the second detection signal wiring 575c. Here, the drive signal wiring 371c extends along the X axis direction, whereas the first detection signal wiring 573c and the second detection signal wiring 575c extend along the Y axis direction. For this reason, even when a position or a posture of the sensor element 3 slightly deviates from a predetermined position or a predetermined posture, it is possible to reduce a change in a difference of a capacity between the drive signal wiring 371c and the first detection signal wiring 573c and a capacity between the drive signal wiring 371c and the second detection signal wiring 575c. In view of allowing such a deviation, a distance L3 between an end of the drive signal wiring 371c and the first detection signal wiring 573c or the second detection signal wiring 575c may be equal to or larger than 175 μm and equal to or smaller than 600 μm or may be equal to or larger than 250 μm and equal to or smaller than 550 μm.

As described above, the physical quantity sensor 1 includes the base 21, the relay substrate 5 as a supporting member supported by the base 21, and the sensor element 3 supported by the relay substrate 5. The sensor element 3 includes the vibrator element 30 and the drive signal wiring 371c, the first detection signal terminal 373b, and the second detection signal terminal 375b disposed on the vibrator element 30. Here, the drive signal wiring 371c transmits a drive signal for vibrating the drive arms 316, 317, 318, and 319 as a drive portion of the vibrator element 30 and extends along the line segment X1 as a first axis. The first detection signal terminal 373b and the second detection signal terminal 375b output a detection signal in accordance with vibration of the detection arms 312 and 313 as a detection portion of the vibrator element 30. On the other hand, the relay substrate 5 includes the third portion 53 as a substrate to which the sensor element 3 joined and the first detection signal wiring 573c and the second detection signal wiring 575c disposed on the third portion 53. Here, the first detection signal wiring 573c transmits the detection signal from the first detection signal terminal 373b. The second detection signal wiring 575c transmits the detection signal from the second detection signal terminal 375b.

The first detection signal wiring 573c and the second detection signal wiring 575c include the portions 573d and 575d intersecting with the drive signal wiring 371c side by side in a width direction, that is, a direction orthogonal to the second axis along the Y axis as the second axis intersecting with the line segment X1 when seen in a plan view in the Z axis direction which is a direction in which the sensor element 3 and the third portion 53 are disposed in a line.

According to the physical quantity sensor 1, by interposing the relay substrate 5 between the package 2 and the sensor element 3, it is possible to reduce transmission of a stress such as a thermal stress from the package 2 to the sensor element 3. As a result, it is possible to improve detection accuracy of the physical quantity sensor 1.

In addition, since the first detection signal wiring 573c and the second detection signal wiring 575c of the relay substrate 5 include the portions intersecting with the drive signal wiring 371c of the sensor element 3 side by side in the width direction in a plan view, that is, the portions 573d and 575d closely facing each other, it is possible to reduce the difference (hereinafter, also simply referred to as "capacitance difference") of the capacity between the drive signal wiring 371c and the first detection signal wiring 573c and the capacity between the drive signal wiring 371c and the second detection signal wiring 575c. Further, even when a positional deviation occurs when the sensor element 3 is installed on the relay substrate 5, it is possible to reduce a change in the capacitance difference due to the positional deviation. Therefore, it is possible to reduce a difference between a quantity of a noise mixed from the drive signal wiring 371c with the first detection signal wiring 573c and a quantity of a noise mixed from the drive signal wiring 371c with the second detection signal wiring 575c. For this reason, by differentially amplifying the first detection signal and the second detection signal, it is possible to cancel out or reduce these noises. As a result, it is possible to provide the physical quantity sensor 1 with high sensibility.

Here, in a plan view, the portions 573d and 575d are positioned closer to a center of the relay substrate 5 than an outer edge of the third portion 53. Accordingly, even when the positional deviation occurring when the sensor element 3 is installed on the relay substrate 5 is relatively large, it is possible to reduce a change in an area in which the first detection signal wiring 573c and the second detection signal wiring 575c in a plan view, and the drive signal wiring 371c overlap with each other, and as a result, it is possible to reduce a change in a capacitance difference due to the positional deviation. On the other hand, in a case where the portions 573d and 575d are positioned closer to the outer edge than the center of the third portion 53, if the positional deviation occurring when the sensor element 3 is installed on the relay substrate 5 occurs, the area in which the first detection signal wiring 573c and the second detection signal wiring 575c, and the drive signal wiring 371c overlap with each other in a plan view changes or even if the area does not change, a fringe capacitance occurs between one detection signal wiring and the outer edge of the sensor element 3, so that the capacitance difference tends to change.

The relay substrate 5 as a supporting member of the present embodiment includes the first portion 51 in a frame shape, the second portion 52 in a frame shape disposed inside the first portion 51, the third portion 53 as a substrate disposed inside the second portion 52, the first beam portion 54 which swingably supports the second portion 52 around the axis a1 as a third axis from the first portion 51, and the second beam portion 55 which swingably supports the third portion 53 around the axis a2 as a fourth axis intersecting with the axis a1 from the second portion 52. The first portion 51 is joined to the base 21 and the sensor element 3 is joined to the third portion 53. By using the relay substrate 5 with this configuration, it is possible to reduce a stress transmitted from the base 21 to the sensor element 3 via the relay substrate 5. In addition, it is possible to improve impact resistance of the physical quantity sensor 1.

As illustrated in FIG. 13 described above, the relay substrate 5 may have a configuration in which the second beam portion 55 is omitted. That is, the relay substrate 5 as a supporting member may be configured to include the first portion 51 in a frame shape joined to the base 21, the third portion 53 as a substrate disposed inside the first portion 51, and the first beam portion 54 which swingably supports the third portion 53 around the axis a1 as a third axis from the first portion 51. Also in this configuration, it is possible to reduce a stress transmitted from the base 21 to the sensor element 3 via the relay substrate 5. In addition, it is possible to improve impact resistance of the physical quantity sensor 1.

Further, although the sensor element 3 and the relay substrate 5 are joined via the joining material 61, the joining material 61 may be a metal bump. That is, the physical quantity sensor 1 may include the joining material 61 which is a metal bump joining the sensor element 3 and the third portion 53 as a substrate. Accordingly, it is possible to reduce a variation in a distance between the sensor element 3 and the relay substrate 5 when the sensor element 3 is installed on the relay substrate 5. For this reason, it is possible to reduce a variation in the capacitance difference described above due to the variation in the distance.

A method of manufacturing the physical quantity sensor 1 includes a step of preparing the base 21, the relay substrate 5, and the sensor element 3 and a step of joining the relay substrate 5 and the sensor element 3. According to the method of manufacturing the physical quantity sensor 1, it is possible to provide the physical quantity sensor 1 with high sensitivity.

1b. Second Embodiment

Figure 14:
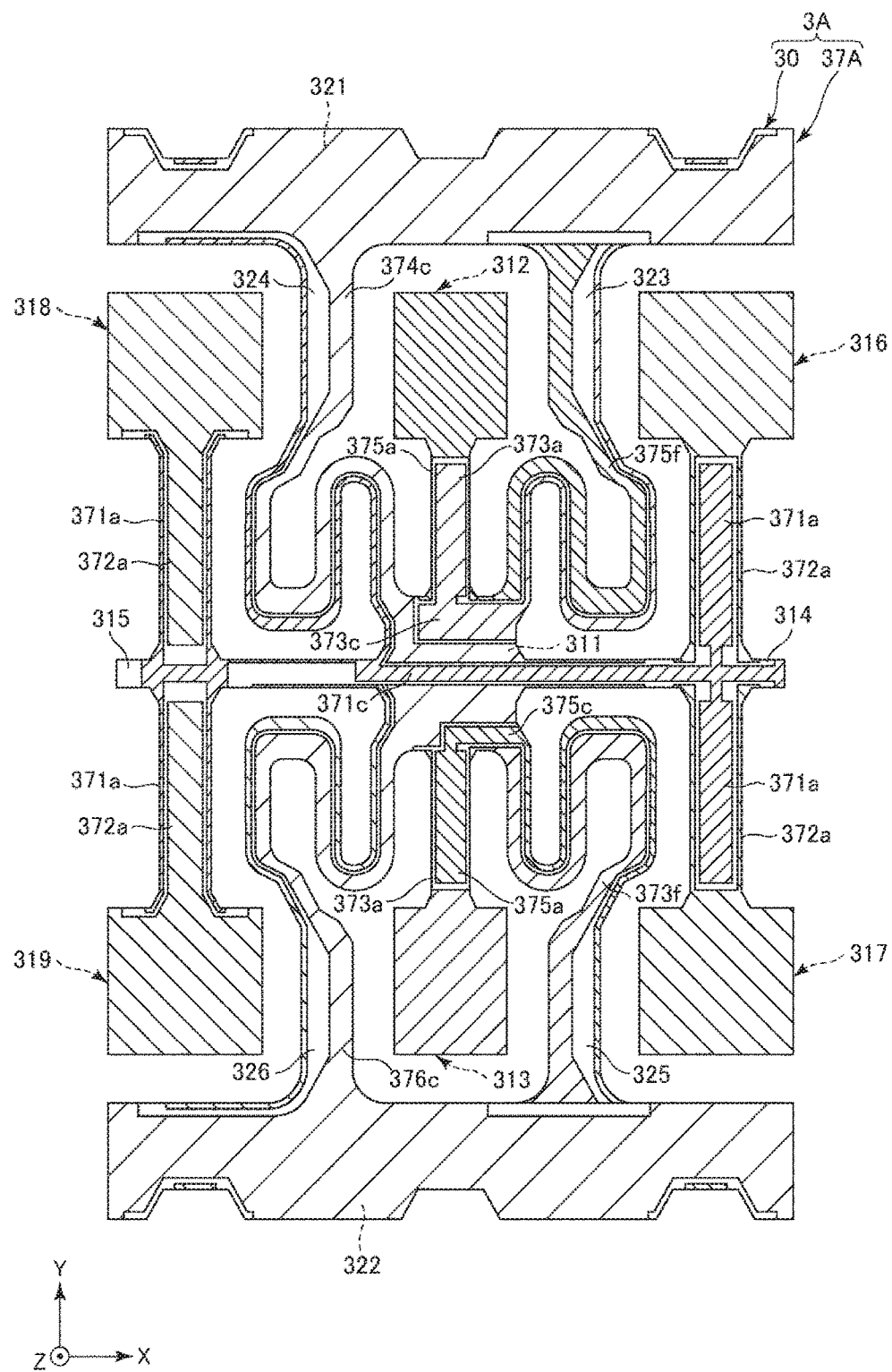
FIG. 14 is a plan view of an electrode pattern of a sensor element according to a second embodiment when seen from the +Z axis direction side.
Figure 15:
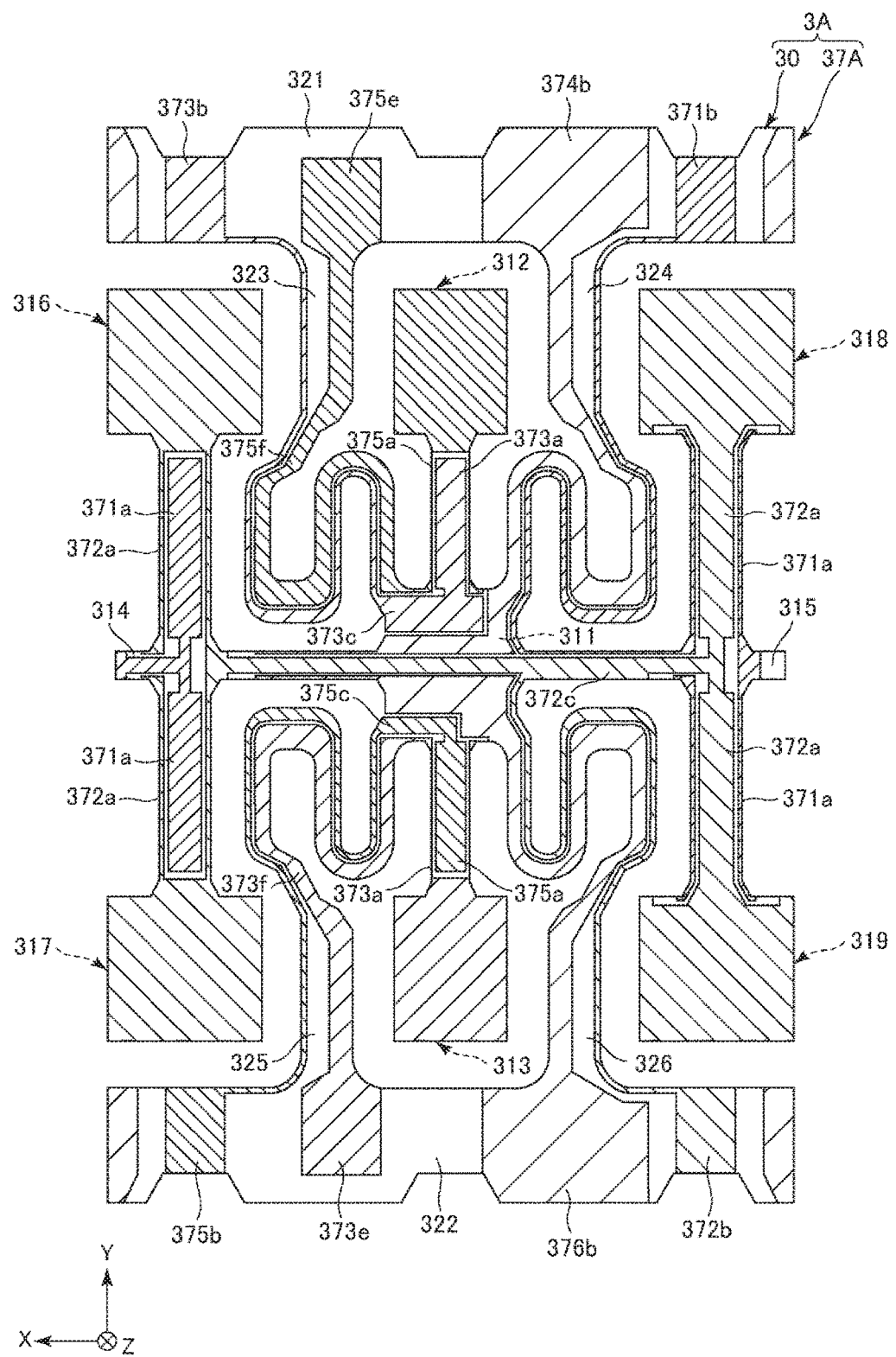
FIG. 15 is a plan view of the electrode pattern of the sensor element illustrated in FIG. 14 when seen from the −Z axis direction side.
Figure 16:
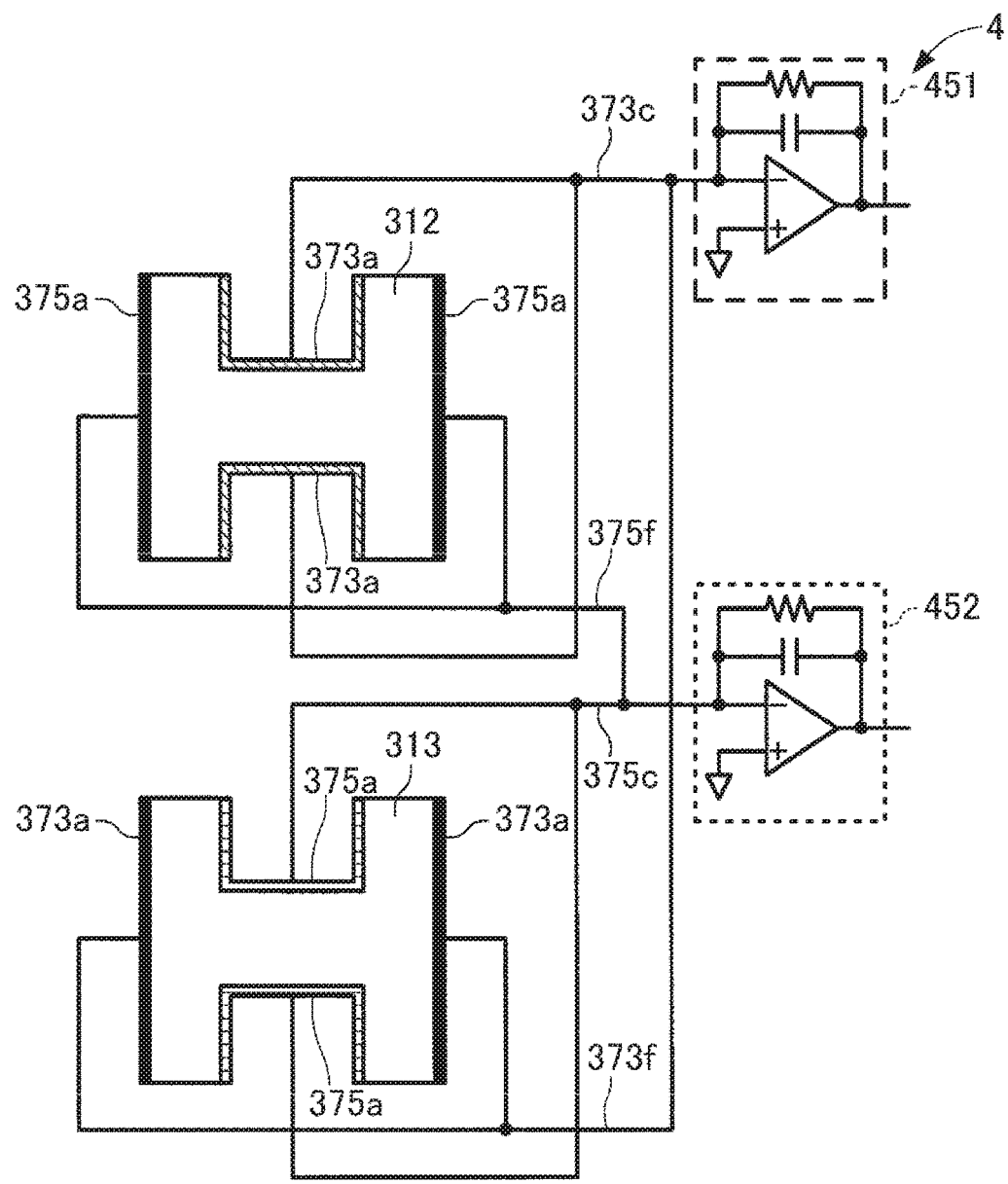
FIG. 16 is a diagram illustrating a coupling state between a first detection signal wiring and a second detection signal wiring, and a charge amplifier in the second embodiment.
Figure 17:
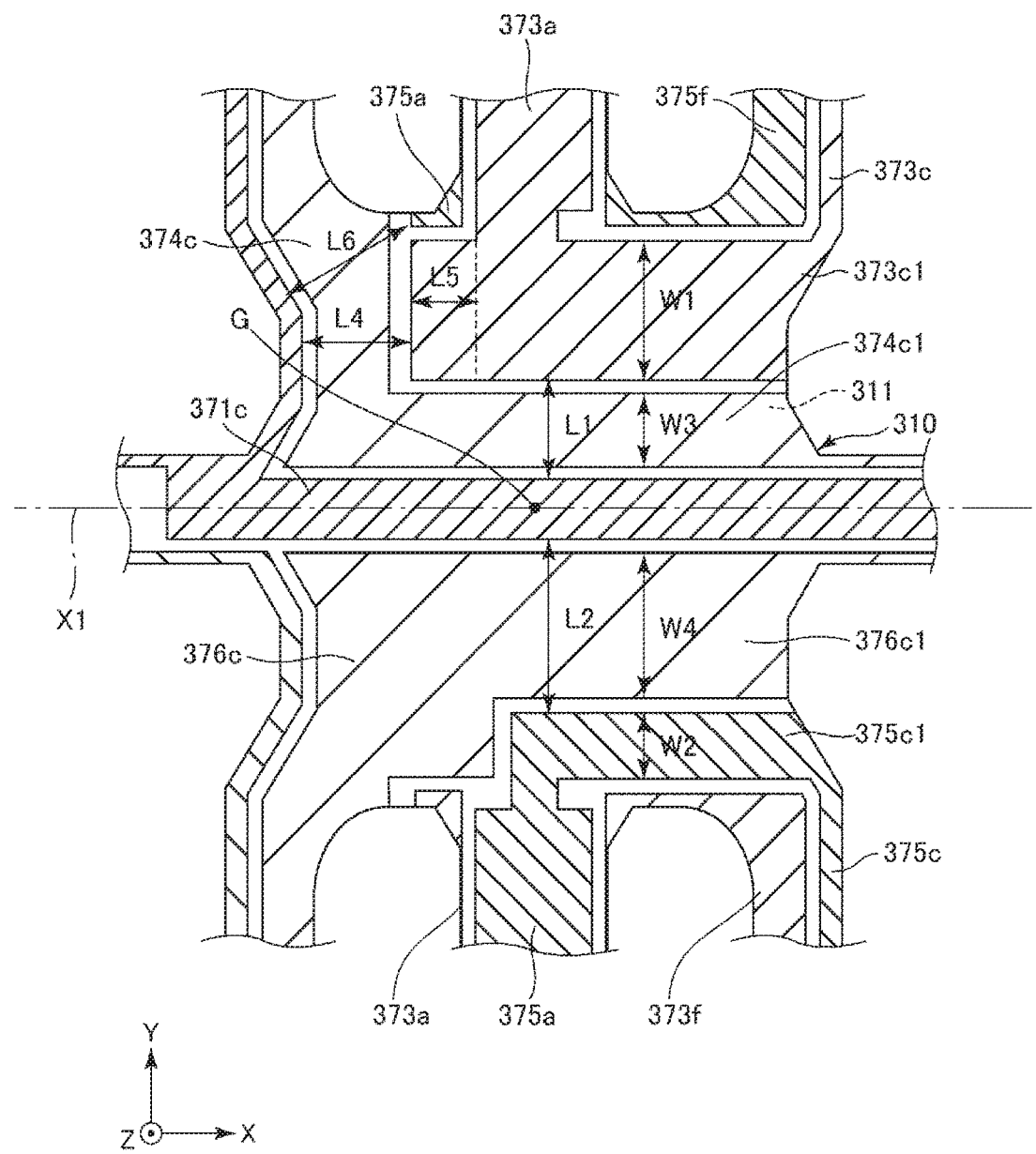
FIG. 17 is an enlarged plan view illustrating a drive signal wiring, and the first detection signal wiring and the second detection signal wiring of the sensor element illustrated in FIG. 14.
Figure 18:
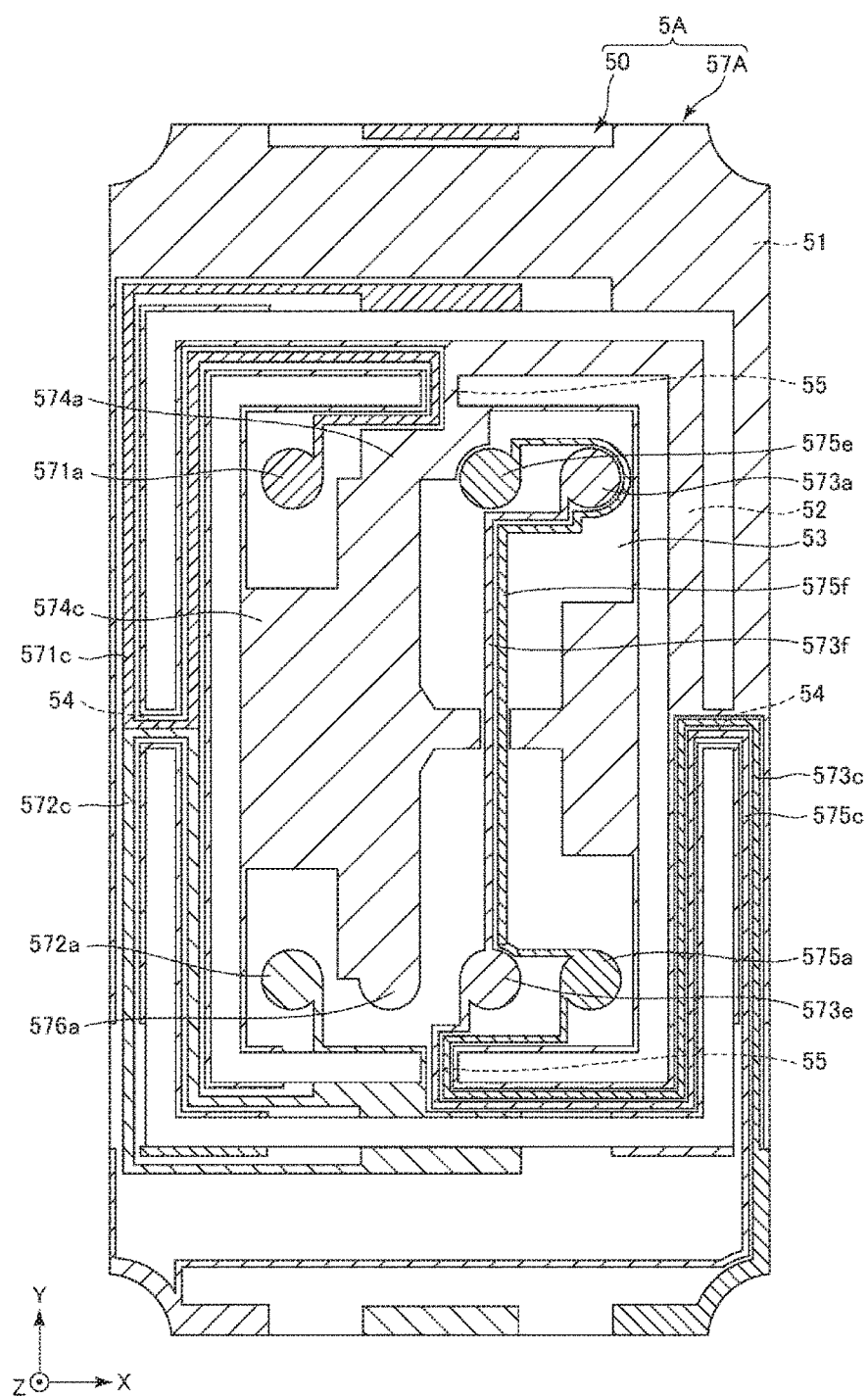
FIG. 18 is a plan view of an electrode pattern of a relay substrate according to the second embodiment when seen from the +Z axis direction side.

FIG. 14 is a plan view of an electrode pattern of a sensor element according to the second embodiment when seen from the +Z axis direction side. FIG. 15 is a plan view of the electrode pattern of the sensor element illustrated in FIG. 14 when seen from the −Z axis direction side. FIG. 16 is a diagram illustrating a coupling state between a first detection signal wiring and a second detection signal wiring, and a charge amplifier according to the second embodiment. FIG. 17 is an enlarged plan view illustrating a drive signal wiring, and the first detection signal wiring and the second detection signal wiring of the sensor element illustrated in FIG. 14. FIG. 18 is a plan view of an electrode pattern of a relay substrate according to the second embodiment when seen from the +Z axis direction side.

The present embodiment is the same as the first embodiment described above except that shapes of the electrode pattern of the sensor element and the relay substrate are different. In the following description, for the second embodiment, a difference from the first embodiment will be mainly described, and the same items are denoted by the same reference numerals, and description thereof will be not repeated.

As illustrated in FIGS. 14 and 15, a sensor element 3A according to the present embodiment includes the vibrator element 30 and an electrode pattern 37A provided on a surface of the vibrator element 30.

In the electrode pattern 37A, the first detection signal electrode 373a is provided on the upper and lower surfaces of the arm portion of the detection arm 312 and both side surfaces of the arm portion of the detection arm 313, and outputs a charge generated by detection vibration of the detection arms 312 and 313 as a first detection signal. Here, as illustrated in FIG. 15, the first detection signal electrode 373a provided on the detection arm 313 is coupled to a first detection signal terminal 373e via a first detection signal wiring 373f. The first detection signal terminal 373e is provided on the lower surface of the supporting portion 322. In addition, the first detection signal wiring 373f is led from above the base portion 311 onto the supporting portion 322 via an upper side of the beam portion 325.

Further, the second detection signal electrode 375a is provided on both side surfaces of the arm portion of the detection arm 312 and the upper and lower surfaces of the arm portion of the detection arm 313, and outputs a charge generated by detection vibration of the detection arms 312 and 313 as a second detection signal. Here, as illustrated in FIG. 15, the second detection signal electrode 375a provided on the detection arm 312 is coupled to a second detection signal terminal 375e via a second detection signal wiring 375f. The second detection signal terminal 375e is provided on the lower surface of the supporting portion 321. In addition, the second detection signal wiring 375f is led from above the base portion 311 onto the supporting portion 321 via an upper side of the beam portion 323.

In this manner, in the present embodiment, the first detection signal wiring 373c and the second detection signal wiring 375f are withdrawn from above the detection arm 312 (first detection arm) onto the base portion 311 and the first detection signal wiring 373f and the second detection signal wiring 375c are withdrawn from above the detection arm 313 (second detection arm) onto the base portion 311. For example, as illustrated in FIG. 16, the first detection signal wirings 373c and 373f are respectively coupled to the charge amplifier 451 and the second detection signal wirings 375c and 375f are respectively coupled to the charge amplifier 452. Accordingly, it is possible to obtain the first detection signal and the second detection signal which are twice as much as a charge quantity of the first embodiment described above. For this reason, it is possible to improve detection sensitivity of the sensor element 3A.

In the present embodiment, as illustrated in FIG. 17, the width W1 which is a length of the first detection signal wiring 373c in the Y axis direction is larger than the width W2 which is a length of the second detection signal wiring 375c in the Y axis direction. Accordingly, the distance L1 between the constant width portion of the drive signal wiring 371c and the first detection signal wiring 373c becomes smaller than the distance L2 between the constant width portion of the drive signal wiring 371c and the second detection signal wiring 375c. For this reason, it is possible to reduce a difference between the first capacity and the second capacity.

In addition to this, the first detection signal wiring 373c is longer toward a −X axis direction side by a length L5 so as to approach a portion (also referred to as a "withdrawn portion") drawn to a side surface of the base portion 311 of the drive signal wiring 371c. Accordingly, a difference between a distance L4 which is a minimum separation distance between a withdrawn portion of the drive signal wiring 371c and the first detection signal wiring 373c and a distance L6 which is a minimum separation distance between a withdrawn portion of the drive signal wiring 371c and the second detection signal electrode 375a becomes small. Accordingly, even in the wiring disposition as in the present embodiment, it is possible to extremely reduce the difference between the first capacitance and the second capacitance.

As illustrated in FIG. 18, a relay substrate 5A according to the present embodiment includes the substrate 50 and an electrode pattern 57A provided on the substrate 50.

In the electrode pattern 57A, a first detection signal terminal 573e and a second detection signal terminal 575e are disposed on the upper surface of the third portion 53 of the substrate 50. The first detection signal terminal 573e is provided corresponding to the first detection signal terminal 373e of the sensor element 3A described above and is coupled to the first detection signal wiring 573c having a portion 573f. The second detection signal terminal 575e is provided corresponding to the second detection signal terminal 375e of the sensor element 3A described above and is coupled to the second detection signal wiring 575c having a portion 575f.

In a state in which the sensor element 3A is mounted on the relay substrate 5A, the drive signal wiring 371c of the sensor element 3A intersects with both of the portion 573f of the first detection signal wiring 573c and the portion 575f of the second detection signal wiring 575c of the relay substrate 5A when seen in the Z axis direction. Accordingly, it is possible to reduce a difference between a quantity of a noise mixed from the drive signal wiring 371c with the first detection signal wiring 573c and a quantity of a noise mixed from the drive signal wiring 371c with the second detection signal wiring 575c.

According to the second embodiment as described above, the same effects as the first embodiment described above can be also obtained.

1c. Third Embodiment

Figure 19:
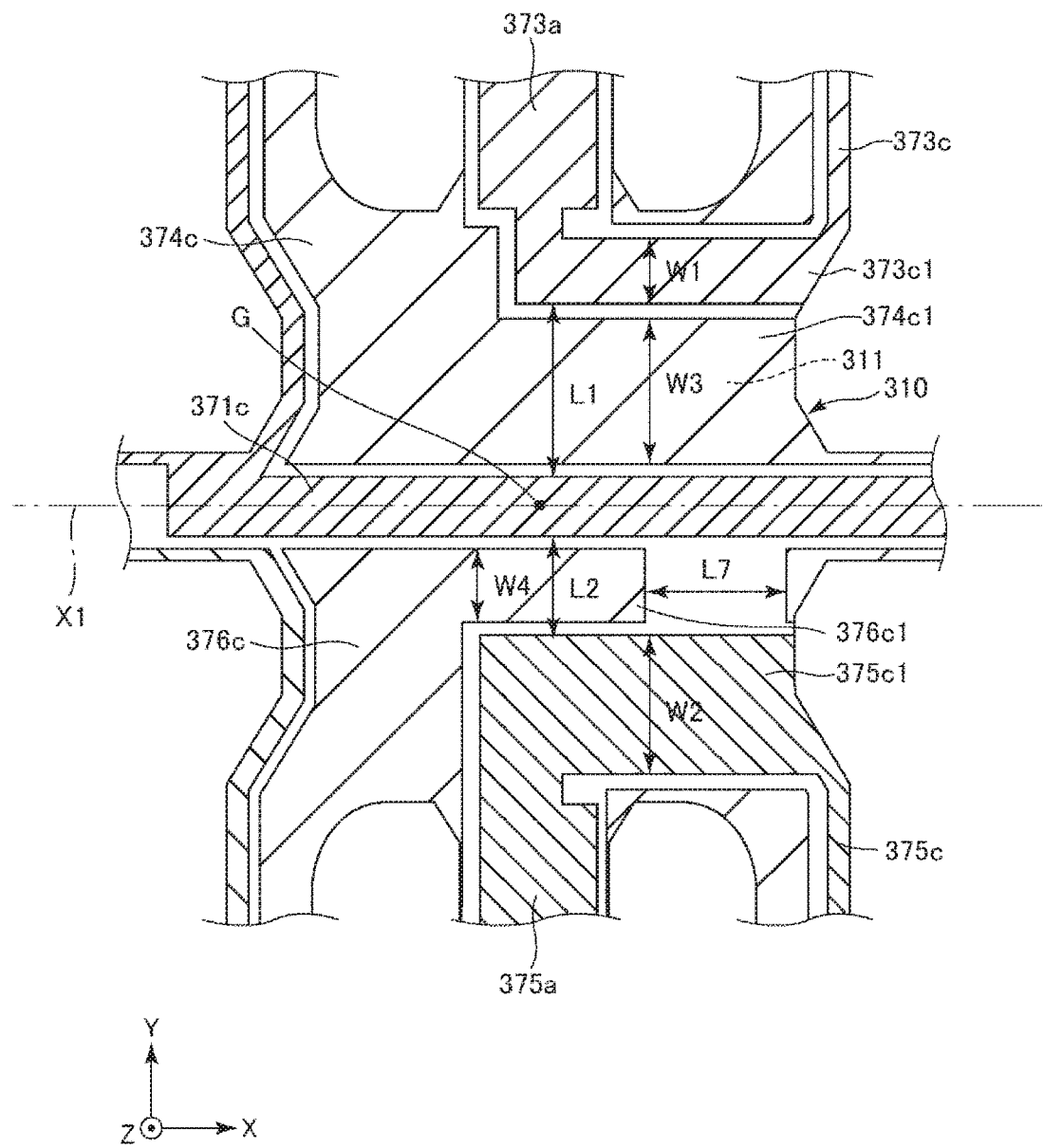
FIG. 19 is an enlarged plan view illustrating a drive signal wiring, and a first detection signal wiring and a second detection signal wiring of a sensor element according to a third embodiment.
Figure 20:
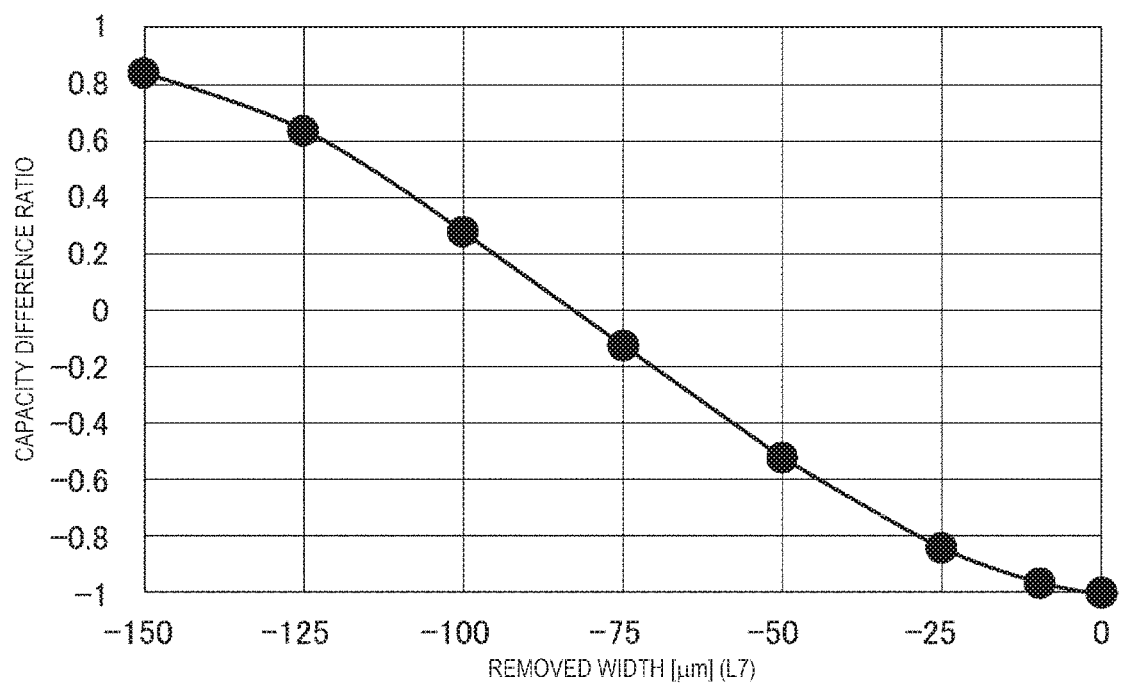
FIG. 20 is a graph illustrating a relationship between a removed width L7 and a capacitance difference illustrated in FIG. 19.

FIG. 19 is an enlarged plan view illustrating a drive signal wiring, and a first detection signal wiring and a second detection signal wiring of a sensor element according to the third embodiment. FIG. 20 is a graph illustrating a relationship between a removed width L7 and a capacitance difference illustrated in FIG. 19.

The present embodiment is the same as the first embodiment described above except that a shape of the second fixed potential wiring of the sensor element is different. In the following description, for the third embodiment, a difference from the first embodiment will be mainly described, and the same items are denoted by the same reference numerals, and description thereof will be not repeated.

In the present embodiment, as illustrated in FIG. 19, a part of the second fixed potential wiring 376c is removed on the base portion 311. Accordingly, it is possible to adjust the difference between the first capacity and the second capacity by decreasing an electromagnetic shielding property of the second fixed potential wiring 376c than the first fixed potential wiring 374c.

In this manner, in the present embodiment, also if lengths of the first portion at which the first fixed potential wiring 374c is positioned between the drive signal wiring 371c and the first detection signal wiring 373c on the base portion 311 and the second portion in which the second fixed potential wiring 376c is positioned between the drive signal wiring 371c and the second detection signal wiring 375c on the base portion 311 are different from each other, it is possible to adjust the difference between the first capacity and the second capacity.

Here, as illustrated in FIG. 20, the difference between the first capacitance and the second capacitance changes according to a length L7 of a removed portion of the second fixed potential wiring 376c in the X axis direction, that is, a removal width. Therefore, the length L7 may be adjusted so that the difference between the first capacitance and the second capacitance becomes small. "Capacity difference ratio" on the vertical axis in FIG. 20 is a value normalized with a value of the capacitance difference as a reference when the length L7 is 0.

According to the third embodiment as described above, the same effects as the first embodiment described above can be also obtained.

2. Electronic Apparatus

Figure 21:
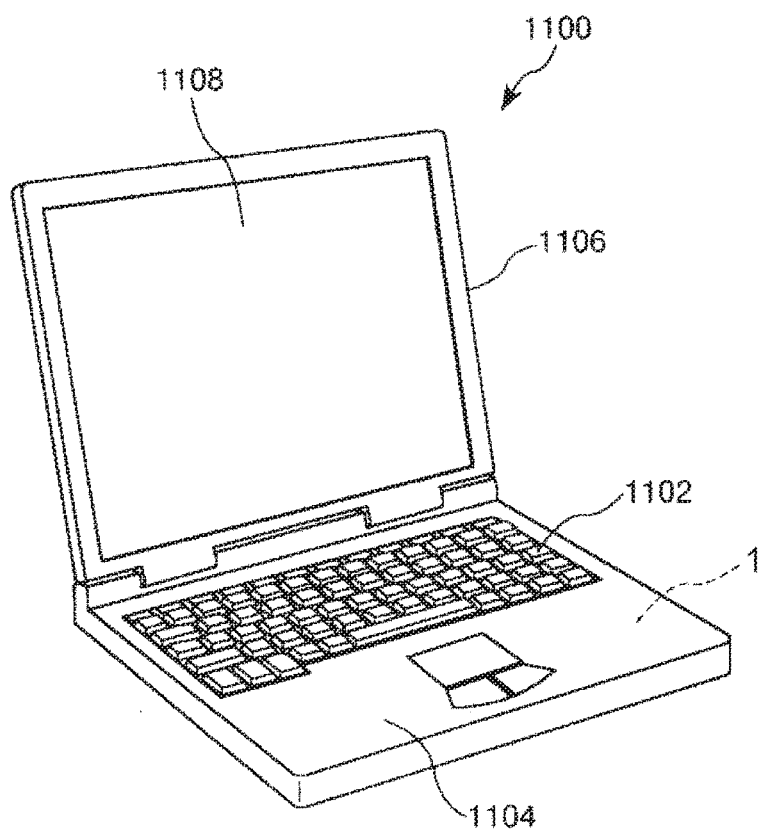
FIG. 21 is a perspective view illustrating a configuration of a mobile type or a notebook type personal computer which is an electronic apparatus according to the embodiment.

FIG. 21 is a perspective view illustrating a configuration of a mobile type or a notebook type personal computer which is an electronic apparatus according to the embodiment.

In FIG. 21, a personal computer 1100 is configured to include a main body portion 1104 having a keyboard 1102 and a display unit 1106 having a display unit 1108, and the display unit 1106 is pivotably supported from the main body portion 1104 via a hinge structure portion. In the personal computer 1100, the physical quantity sensor 1 is mounted.

Figure 22:
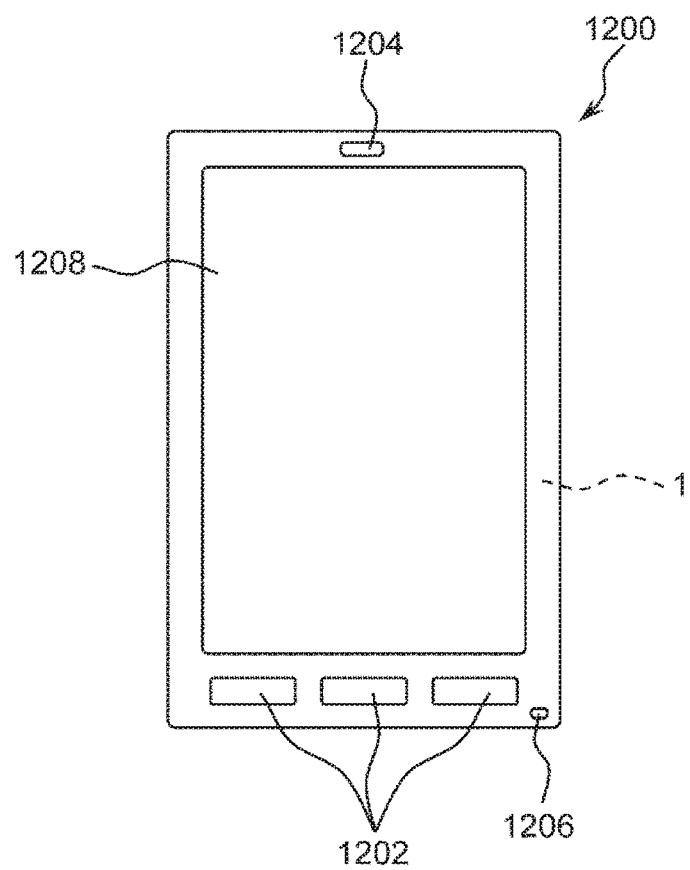
FIG. 22 is a perspective view illustrating a configuration of a mobile phone which is an electronic apparatus according to the embodiment.

FIG. 22 is a perspective view illustrating a configuration of a mobile phone which is an electronic apparatus according to the embodiment.

In FIG. 22, a mobile phone 1200 includes an antenna (not illustrated), a plurality of operation buttons 1202, an earpiece 1204, and a mouthpiece 1206. A display unit 1208 is disposed between the operation button 1202 and the earpiece 1204. In the mobile phone 1200, the physical quantity sensor 1 is mounted.

Figure 23:
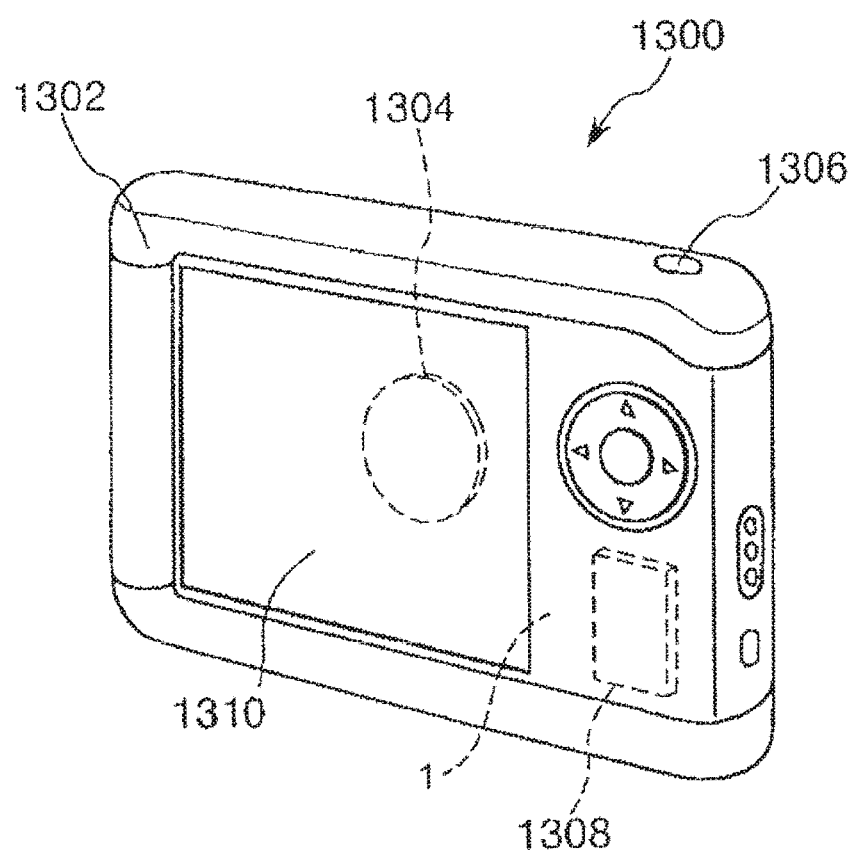
FIG. 23 is a perspective view illustrating a configuration of a digital still camera which is an electronic apparatus according to the embodiment.

FIG. 23 is a perspective view illustrating a configuration of a digital still camera which is an electronic apparatus according to the embodiment.

A digital still camera 1300 is configured to include a display unit 1310 provided on a rear surface of a case 1302 of the digital still camera 1300 and to perform display based on an imaging signal by a CCD. The display unit 1310 functions as a viewfinder which displays a subject as an electronic image. In addition, a light receiving unit 1304 including an optical imaging system such as an optical lens or the like, the CCD, and the like is provided on a rear surface side of the case 1302 in FIG. 23. When a photographer confirms a subject image displayed on the display unit 1310 and presses a shutter button 1306, an imaging signal of the CCD at that time is transmitted to and stored in a memory 1308. In the digital still camera 1300, the physical quantity sensor 1 is mounted.

The electronic apparatus as described above includes the physical quantity sensor 1 according to the first to third embodiments described above. Here, as described above, the physical quantity sensor 1 includes the sensor element 3 or 3A and the circuit element 4 as a control circuit which outputs a drive signal to the sensor element 3 or 3A and to which a detection signal is input. According to the electronic apparatus as described above, it is possible to improve a property of the electronic apparatus by using a detection result of the sensor element 3 or 3A or the physical quantity sensor 1 with high sensibility.

The electronic apparatus according to the present application example can be applied to, for example, a smartphone, a tablet terminal, a timepiece such as smart watch, an ink jet type ejecting apparatus such as an ink jet printer, a laptop type personal computer, a television, a wearable terminal such as an HMD (head mounted display), a video camera, a video tape recorder, a car navigation device, a pager, an electronic diary (including a communication function), an electronic dictionary, an electronic calculator, an electronic game apparatus, a word processor, a work station, a video phone, a security monitor for television, a pair of electronic binoculars, a POS terminal, a medical apparatus (for example, an electronic thermometer, a sphygmomanometer, a blood glucose monitoring device, an electrocardiogram measuring device, an ultrasonic diagnostic device, an electronic endoscope), a fish finder, various measuring instruments, an apparatus for a vehicle terminal base station, an instrument (for example, an instrument of a vehicle, an aircraft, or a ship), a flight simulator, a network server, and the like in addition to the personal computer in FIG. 21, the mobile phone in FIG. 22, and the digital still camera in FIG. 23.

3. Vehicle

Figure 24:
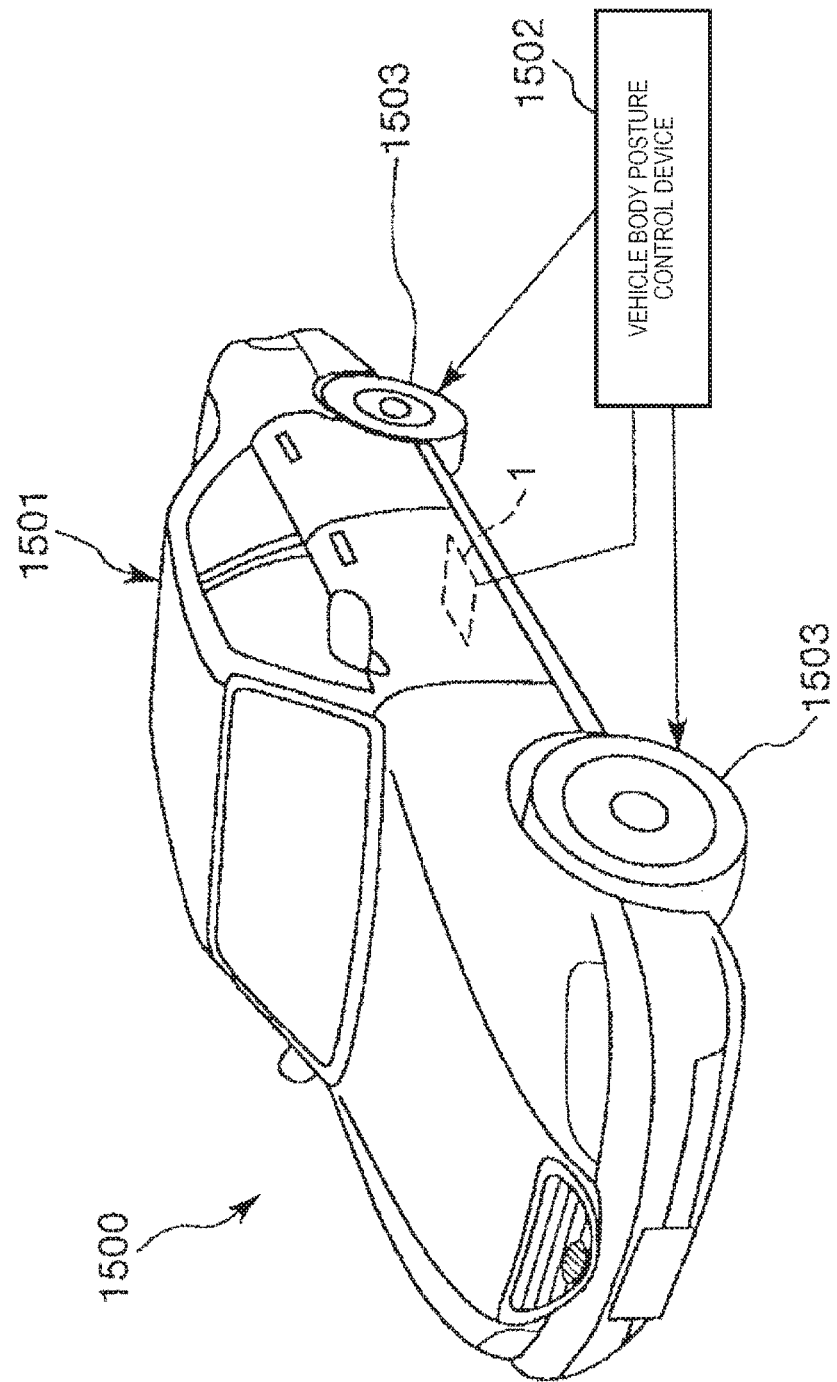
FIG. 24 is a perspective view illustrating an automobile which is a vehicle according to the embodiment.

FIG. 24 is a perspective view illustrating an automobile which is a vehicle according to the embodiment.

In FIG. 24, an automobile 1500 includes a vehicle body 1501 which is a body and four wheels 1503, and is configured to rotate the wheel 1503 by a power source such as an engine (not illustrated) provided in the vehicle body 1501.

In the vehicle body 1501 of the automobile 1500, the physical quantity sensor 1 is mounted. According to the physical quantity sensor 1, it is possible to detect a posture or a moving direction of the vehicle body 1501. A detection signal of the physical quantity sensor 1 is supplied to a vehicle body posture control device 1502. By detecting a posture of the vehicle body 1501 based on the signal, the vehicle body posture control device 1502 can control a hardness of a suspension according to the detection result or can control a brake of the individual wheels 1503.

The vehicle including the physical quantity sensor 1 is not limited to the automobile, but can also be applied to, for example, another vehicle such as a motorcycle, a railroad, an aircraft, a ship, a spacecraft, a biped walking robot, a radio control helicopter, or the like.

As described above, the automobile 1500 which is a vehicle includes the physical quantity sensor 1 according to the first to third embodiments described above. Here, as described above, the physical quantity sensor 1 includes the sensor element 3 or 3A and the circuit element 4 as a control circuit which outputs a drive signal to the sensor element 3 or 3A and to which a detection signal is input. According to the automobile 1500 as described above, it is possible to improve a property of the automobile 1500 by using a detection result of the sensor element 3 or 3A or the physical quantity sensor 1 with high sensibility.

Hereinbefore, the physical quantity sensor, the method of manufacturing the physical quantity sensor, the electronic apparatus, and the vehicle according to the present disclosure are described based on the embodiments illustrated in the accompanying drawings, but the present disclosure is not limited thereto and the configuration of each of the portions can be replaced with any configuration having the same function. Further, any other component may be added to the present disclosure. In addition, each of the embodiments may be appropriately combined.

In the embodiment described above, the example in which the vibrator element of the sensor element has a double T type is described, but the sensor element may be a vibrator element in which the drive signal wiring, the first detection signal terminal, and the second detection signal terminal are provided and is not limited to a double T type of vibrator element. For example, the present disclosure also can be applied to an H type or a tuning fork type vibrator element.

In addition, in the embodiment described above, the example in which the relay substrate is directly coupled to the package is described, but the present disclosure is not limited thereto. For example, the relay substrate may be coupled to the package via the circuit element.

What is claimed is:

1. A physical quantity sensor comprising:
   a base;
   a supporting member supported by the base; and a sensor element supported by the supporting member, wherein
the sensor element includes
- a vibrator element having a pair of drive arms and a pair of detection arms,
- a drive signal wiring that is disposed on the vibrator element, that transmits a drive signal for vibrating a drive portion of the vibrator element, and that extends along a first axis, and
- a first detection signal terminal and a second detection signal terminal that are disposed on the pair of detection arms and that output detection signals in accordance with vibration of the pair of detection arms, the supporting member includes
- a substrate on which the sensor element is joined,
- a first detection signal wiring that is disposed on the substrate and that transmits the detection signal from the first detection signal terminal,
- a second detection signal wiring that is disposed on the substrate and that transmits the detection signal from the second detection signal terminal,
- a first portion in a frame shape joined to the base,
- the substrate to which the sensor element is joined and which is disposed inside the first portion, and
- a first beam portion swingably supporting the substrate around a third axis with respect to the first portion, and the first detection signal wiring and the second detection signal wiring respectively include areas that extend along a second axis intersecting with the first axis and that intersect with the drive signal wiring in a plan view as seen in a direction in which the sensor element and the substrate overlap with each other.

2. The physical quantity sensor according to claim 1, wherein
the area of the first detection signal wiring that extends along the second axis and that intersects with the drive signal wiring in a plan view is positioned closer to a center of the substrate than an outer edge of the substrate in the plan view.

3. The physical quantity sensor according to claim 1, wherein the supporting member includes
- a second portion in a frame shape disposed inside the first portion,
- the substrate to which the sensor element is joined and which is disposed inside the second portion,
- the first beam portion swingably supporting the second portion around the third axis with respect to the first portion, and
- a second beam portion swingably supporting the substrate around a fourth axis intersecting with the third axis with respect to the second portion.

4. The physical quantity sensor according to claim 1, further comprising:
a metal bump joining the sensor element and the substrate.

5. A method of manufacturing a physical quantity sensor having a base, a supporting member supported by the base, and a sensor element supported by the supporting member, the method comprising:
preparing the base, the supporting member, and the sensor element; and
joining the supporting member and the sensor element, wherein
in the preparing,
the sensor element includes
- a vibrator element having a pair of drive arms and a pair of detection arms,
- a drive signal wiring that is disposed on the vibrator element, that transmits a drive signal for vibrating a drive portion of the vibrator element, and that extends along a first axis, and
- a first detection signal terminal and a second detection signal terminal that are disposed on the pair of detection arms and that output detection signals in accordance with vibration of the pair of detection arms, the supporting member includes
- a substrate,
- a first detection signal wiring that is disposed on the substrate and that transmits the detection signal from the first detection signal terminal,
- a second detection signal wiring that is disposed on the substrate and that transmits the detection signal from the second detection signal terminal,
- a first portion in a frame shape joined to the base,
- the substrate to which the sensor element is joined and which is disposed inside the first portion, and
- a first beam portion swingably supporting the substrate around a third axis with respect to the first portion, and in the joining,
the first detection signal wiring and the second detection signal wiring respectively include areas that extend along a second axis intersecting with the first axis and that intersect with the drive signal wiring in a plan view as seen in a direction in which the sensor element and the substrate overlap with each other.

6. An electronic apparatus comprising:
the physical quantity sensor according to claim 1, wherein the physical quantity sensor includes a circuit element.

7. A vehicle comprising:
the physical quantity sensor according to claim 1; and
a body on which the physical quantity sensor is mounted.

* * * * *